US012741904B2

(12) United States Patent
Cheng

(10) Patent No.: US 12,741,904 B2
(45) Date of Patent: Sep. 22, 2026

(54) CRYSTALLIZED GLASS RAW MATERIAL, PREPARATION METHOD THEREFOR AND USE THEREOF

(71) Applicant: CHONGQING AUREAVIA HI-TECH GLASS CO., LTD, Chongqing (CN)

(72) Inventor: Cheng Cheng, Chongqing (CN)

(73) Assignee: CHONGQING AUREAVIA HI-TECH GLASS CO., LTD, Chongqing (CN)

( * ) Notice: Subject to any disclaimer, the term of this patent is extended or adjusted under 35 U.S.C. 154(b) by 539 days.

(21) Appl. No.: 18/273,511

(22) PCT Filed: Jan. 21, 2022

(86) PCT No.: PCT/CN2022/073214
§ 371 (c)(1),
(2) Date: Jul. 20, 2023

(87) PCT Pub. No.: WO2022/156772
PCT Pub. Date: Jul. 28, 2022

(65) Prior Publication Data

US 2024/0317636 A1 Sep. 26, 2024

(30) Foreign Application Priority Data

Jan. 25, 2021 (CN) ......................... 202110099277.4
Jan. 25, 2021 (CN) ......................... 202110099301.4

(51) Int. Cl.
*C03C 10/00* (2006.01)
*C03C 4/00* (2006.01)

(52) U.S. Cl.
CPC ........ *C03C 10/0027* (2013.01); *C03C 4/0092* (2013.01); *C03C 10/0054* (2013.01); *C03C 2204/04* (2013.01); *C03C 2214/20* (2013.01)

(58) Field of Classification Search
CPC ........ C03C 3/11; C03C 3/097; C03C 10/0027
See application file for complete search history.

(56) References Cited

U.S. PATENT DOCUMENTS

2020/0017399 A1 1/2020 Click et al.
2020/0131080 A1* 4/2020 Yuan ....................... C03C 3/085
2020/0346969 A1 11/2020 Li et al.

FOREIGN PATENT DOCUMENTS

CN 110894137 A * 3/2020 ........... C03C 21/002
CN 110981206 A 4/2020

(Continued)

OTHER PUBLICATIONS

Chinese Patent Application No. 202110099301.4, first Office Action dated Jun. 20, 2023, 6 pages.

(Continued)

*Primary Examiner* — Noah S Wiese
(74) *Attorney, Agent, or Firm* — Cozen O'Connor

(57) ABSTRACT

A crystallized glass raw material, characterized in that the crystallized glass raw material has a thickness of 0.02-5 mm, and the crystallized glass raw material has a crystallinity of 5-90 wt %. A preparation method for the crystallized glass raw material of the present invention has low processing difficulty and low processing cost; and the preparation method saves on time costs and also saves on energy for heat treatment.

15 Claims, 2 Drawing Sheets

2θ(°)

(56) References Cited

FOREIGN PATENT DOCUMENTS

| | | | | | |
|---|---|---|---|---|---|
| CN | 111087175 | A | | 5/2020 | |
| CN | 111943514 | A | * | 11/2020 | ......... C03C 10/0009 |
| WO | 2019167850 | A1 | | 9/2019 | |
| WO | WO 2020097046 | A1 | | 5/2020 | |
| WO | 2020196171 | A1 | | 10/2020 | |

OTHER PUBLICATIONS

Chinese Patent Application No. 202110099301.4, English translation of first Office Action dated Jun. 20, 2023, 10 pages.
PCT/CN2022/073214, Written Opinion dated Apr. 18, 2022, 6 pages.
Chinese Patent Application No. 202110099301.4, second Office Action dated Apr. 3, 2024, 7 pages.
Chinese Patent Application No. 202110099301.4, English translation of second Office Action dated Apr. 3, 2024, 11 pages.
Chinese Patent Application No. 202110099301.4, third Office Action dated Aug. 5, 2024, 7 pages.
Chinese Patent Application No. 202110099301.4, English translation of third Office Action dated Aug. 5, 2024, 11 pages.
Korean Patent Application No. 10-2023-7027191, Preliminary Office Action dated Jul. 16, 2024, 10 pages.
Korean Patent Application No. 10-2023-7027191, English translation of Preliminary Office Action dated Jul. 16, 2024, 12 pages.
European Patent Application No. 22742251.6, extended Search and Opinion dated Aug. 23, 2024, 7 pages.
First Office Action of the corresponding JP Application No. 2023-544499 issued on Oct. 21, 2025.

* cited by examiner

CRYSTALLIZED GLASS RAW MATERIAL, PREPARATION METHOD THEREFOR AND USE THEREOF

TECHNICAL FIELD

The present disclosure relates to the field of glass preparation technology, and in particular to a crystallized glass raw material, method of its making and use.

BACKGROUND ART

As a new generation of high strength glass, glass-ceramic has higher performance than traditional lithium aluminum silicate glass. Since the glass-ceramic has a large amount of nanoscale crystals inside, it has a more stable structure, and a cover plate product with a higher strength can be obtained after chemical strengthening.

Mobile phone cover plate can be made from the glass raw material through conventional methods. For example, the glass panel is first formed by floating, calendering, and overflowing, and then passed through a cutting, thinning step, followed by CNC (Computerized Numerical Control), polishing, 3D hot bending, 3D polishing, and chemical strengthening. Alternatively, some manufacturers can obtain 3D glass-ceramics by directly purchasing the crystallized glass raw materials, and then by 3D hot bending, 3D polishing and chemical strengthening.

The process of 3D hot bending of crystallized glass raw materials is generally carried out by the following steps that the 3D hot bending is performed using a hot bending machine, wherein the hot bending machine includes a preheating station, shaping station and cooling station, the preheating station includes a preheating mould and a glass sheet, and the function thereof is to promote homogenization of the temperature inside and outside the glass; and the cooling station rapidly cools the mould by cooling water so that the temperature of the glass gradually decreases from a shaping temperature to a depanning temperature. The 3D hot bending mould is a graphite mould, which is divided into an upper part and a lower part. After the glass sheet is put into the mould, the whole 3D hot bending process flow is completed through the preheating stations, shaping stations and cooling station. In order to ensure the output efficiency of 3D hot bending process, a time length of each station is required. In the specific operation, the processed and cleaned glass sheet is placed in a 3D mould, and then the mould is placed in a 3D hot bending machine to perform 3D hot bending according to a pre-set process.

The principle utilized for the 3D hot bending process is as follows: after being heated to a temperature near a softening point, the glass or glass-ceramic can change its shape under the action of an external force, and after changing the shape, the glass or glass-ceramic is subjected to rapid cooling so that the shape obtained after hot-pressing can be maintained. The preheating step in the 3D hot bending process flow can avoid the glass from being broken when heated at a high temperature during forming, wherein the forming temperature is above the softening point, the glass is rapidly softened, and at the same time, upper and lower surfaces of the mould are pressed by a pressing rod to bend and form the glass plate, and the shape of the glass plate is maintained by maintaining the pressure before cooling, and then the mould is rapidly cooled by cooling water. In addition, the 3D hot bending process is protected with nitrogen throughout to avoid mould oxidation.

After forming, cutting and thinning the glass panel, the defects such as edge cracks are reduced by CNC, and the upper and lower surfaces of the glass panel are polished. The 3D hot bending of glass panels performed with CNC and polishing reduces breakage of the glass panels during the hot bending process.

SUMMARY OF THE INVENTION

The existing crystallized glass raw materials are generally in a state of complete crystallization, and when the crystallized glass raw materials which are completely crystallized are used for hot bending to obtain a glass-ceramic, the processing procedure flow thereof is to use the crystallized glass raw materials which are completely crystallized to perform operations such as 3D hot bending, 3D polishing and chemical strengthening. The existing crystallized glass raw materials which are fully crystallized have higher mechanical strength and hardness, resulting in low machining yield and high production cost of the existing crystallized glass raw materials which are fully crystallized before hot bending.

The softening and forming temperatures of the existing crystallized glass raw materials which are fully crystallized are generally no less than 700° C., so that a forming temperature of the 3D hot bending must be above 700° C. During the hot bending process, the original crystal phase type, crystal size, refractive index, Lab (chromaticity) value, haze and transmittance of the crystallized glass raw materials which are fully crystallized change greatly due to heating. In the display scene, the chromaticity and transmittance of the glass-ceramics obtained from the processing on crystallized glass raw material will directly affect the display effects such as display resolution, color gamut and saturation. The refractive index, haze and transmittance, especially the transmittance of ultraviolet and near-ultraviolet, of glass-ceramics obtained from the processing on crystallized glass raw material, which are applied to the lens or protective glass of camera, have an important influence on the optical system of photography and camera shooting, and when the transmittance of ultraviolet and near-ultraviolet is low, the imaging quality will be directly affected.

In addition, the existing 3D hot bending of crystallized glass raw materials which are fully crystallized is only for the purpose of hot bending forming, and there is repeated crystallization, resulting in waste of energy and time. Therefore, the 3D hot bending of the existing crystallized glass raw materials which are fully crystallized has a very high technical difficulty, and it is difficult to achieve the required yield for industrial production by using the 3D hot bending to process into a 3D form.

However, if 3D hot bending forming of the crystallized glass raw materials which are fully crystallized is not used, but the nucleated glass raw material is subjected to 3D hot bending, since the volume shrinkage caused by the crystal grown on an interface between a crystal nucleus and the glass is very obvious in an initial stage of the hot bending and crystallization of the nucleated glass raw material, the more the proportion of the growing crystal is, the larger the volume change of the product is, and the size control is very difficult, so that the nucleated glass raw material will have a relatively large volume change during the hot bending and crystallization, which affects the size accuracy of the 3D hot-bending glass-ceramic after forming.

Therefore, the present disclosure has found that 3D hot-bending is carried out using a crystallized glass raw materials which are partially crystallized, wherein the glass is subjected to hot-bending deformation while the glass continues to be crystallized to reach a target crystallinity by heating, the crystallization process during 3D hot bending is reduced, and the size accuracy of the 3D glass-ceramic after hot-bending is higher.

In addition, in the prior art, a short hot-pressing time is controlled during hot bending, because a long hot-pressing time causes a mould imprint to appear on the surface of the glass-ceramic article, resulting in a decrease in surface quality and affecting the yield. However, the method of the present disclosure uses the partially crystallized glass raw material to perform a 3D hot-bending, the initial crystallinity of the partially crystallized glass raw material is higher, and it is not easy to generate a mould imprint. Furthermore, since the initial crystallinity of the partially crystallized glass raw material is higher, the size deformation per unit time is small in the hot-pressing process, so that a longer hot-pressing time can be accommodated and the deformation after 3D can be controlled more accurately, and a tolerance fluctuation of the profile degree is smaller and the dimension is more stable.

In order to solve the foregoing technical problem, provided is a crystallized glass raw material, characterized in that the crystallized glass raw material has a thickness of 0.02-5 mm, and the crystallized glass raw material has a crystallinity of 5-90 wt %.

Preferably, the thickness is 0.35-1.2 mm, and the crystallized glass raw material has a crystallinity of 30-75 wt % or 75-90 wt %.

Preferably, the crystallized glass raw material has an average transmittance of 83-93%, preferably 85-92% at a wavelength of light of 380-780 nm; alternatively, the crystallized glass raw material has an average transmittance of 80-91%, preferably 83-90% at a wavelength of light of 360-400 nm.

Preferably, the absolute value of b value (yellow-blue value) when the thickness of the crystallized glass raw material is 0.7 mm is 0.2-3, preferably 0.6-2; the crystallized glass raw material has a haze of 0.05-1.0%, preferably 0.2-0.8%.

Preferably, the crystallized glass raw material includes the following ratio of oxides in mol %:

| composition | mol % |
|---|---|
| $SiO_2$ | 55%~74% |
| $Al_2O_3$ | 3%~19% |
| $B_2O_3$ | 0%~4% |
| MgO | 0%~6% |
| $Na_2O$ | 0%~3% |
| $Li_2O$ | 6%~25% |
| $K_2O$ | 0%~1% |
| CaO | 0-2% |
| ZnO | 0-5% |
| rare earth oxide | 0-3% |

wherein, the rare earth oxide being selected from one or two or more of $La_2O_3$, $Eu_2O_3$, $Pr_6O_{11}$, $Nd_2O_3$, $Er_2O_3$ and $Dy_2O_3$.

Preferably, the crystallized glass raw material contains $SiO_2$ and $Al_2O_3$ in a total amount of more than 60% in mol %; preferably 68-80%; alternatively, the crystallized glass raw material contains 7%-30%, preferably 10%-26% of $Na_2O$+$Li_2O$ in mol %.

Preferably, the crystallized glass raw material includes a nucleating agent, wherein, the nucleating agent comprises one or two or more of $P_2O_5$, $TiO_2$, $ZrO_2$, $Cr_2O_3$, $CaF_2$, LiF, NaF, KF, $Y_2O_3$, Au, Ag and Cu on an oxide basis or a fluoride basis or an element basis; preferred are one or two or more of $P_2O_5$, $TiO_2$ and $ZrO_2$.

Preferably, the crystallized glass raw material includes a fining agent, wherein, the fining agent comprises one or two or more of NaCl, $Na_2SO_4$, $SnO_2$, $As_2O_3$, $Sb_2O_3$, $NaNO_3$, $KNO_3$, $CeO_2$ and $(NH_4)_2SO_4$; preferred are one or two or more of NaCl, $SnO_2$, $NaNO_3$ and $CeO_2$.

Preferably, the crystallized glass raw material is crystals with an average particle size of 5-50 nm after being subjected to nucleation and crystallization.

Preferably, the crystallized glass raw material has a Vickers hardness of greater than 500 kgf/mm$^2$, and preferably greater than 560 kgf/mm$^2$, at a force load of 300 gf for 10 s.

The present disclosure also provides a preparation method of the crystallized glass raw material described above, wherein the preparation method includes the steps of:

step 1: mixing and melting raw materials for preparing the 3D glass-ceramic, and then cooling and performing an annealing processing to obtain a glass substrate;

step 2: subjecting the glass substrate obtained in step 1 to nucleation, a cleavage being performed as required before or after the nucleation;

step 3: performing crystallization on the nucleated glass substrate of the step 2;

step 4: cutting the crystallized glass substrate as required to obtain a crystallized glass raw material.

Preferably, in the step 1, a melting temperature is 1350-1700° C.; preferably, the melting temperature is 1400-1650° C.; more preferably, a melt is cooled to 500-1000° C. after melting.

Preferably, the nucleating agent is added in step 1 in an amount of 1-9 mol %, more preferably an amount of 2-5 mol %, of a total amount of the nucleating agent and crystallized glass raw material oxide.

Preferably, the fining agent is added in step 1 in an amount of 0-4 wt %, preferably 0.1-2 wt % of a total mass of the nucleating agent and the crystallized glass raw material oxide.

Preferably, in the step 2, the nucleation is performed at a temperature of 450-800° C., and preferably the nucleation is performed for a time of 30-360 min.

Further preferably, the nucleation is performed at a temperature of 520-570° C., and preferably the nucleation is performed for a time of 120-300 min.

Preferably, in the step 3, the crystallization is performed at a temperature of 550-900° C., and the crystallization is performed for a time of 5-300 min.

Preferably, the crystallization is performed at a temperature of 600-850° C., and the crystallization is performed for a time of 10-240 min.

Further preferably, the crystallization is performed at a temperature of 600-750° C., and the crystallization is performed for a time of 10-150 min.

The present disclosure also provides a crystallized glass raw material prepared by the preparation method.

Preferably, the crystallized glass raw material is characterized in that the crystallized glass raw material is transparent or opaque; preferably, the crystallized glass raw material is curved or planar.

The present disclosure also provides use of the crystallized glass raw material in 3D hot bending to produce 3D glass-ceramic.

The present disclosure also provides use of the 3D glass-ceramic prepared from the crystallized glass raw material in a mobile phone display screen, a tablet computer display screen, a palm game, an electronic terminal, a portable digital device, a vehicle-mounted central control screen, an electronic whiteboard glass, a smart home touch screen, a vehicle windshield glass, an aerocraft windshield glass or an aircraft windshield glass.

Advantageous Effects of the Present Disclosure

1. In the present disclosure, 3D hot-bending is carried out using a crystallized glass raw material which is partially crystallized, wherein the glass raw material is subjected to hot-bending deformation while the glass raw material continues to be crystallized to reach a target crystallinity by heating, the crystallization process during 3D hot bending is reduced, and the size accuracy of the 3D glass-ceramic obtained via hot-bending of the crystallized glass raw material is higher. A preparation method for the crystallized glass raw material of the present invention has low processing difficulty and low processing cost, and the preparation method saves on time costs and also saves on energy for heat treatment. The use of partially crystallized glass raw material for 3D hot bending avoids the problem of repeated crystallization during 3D hot bending of existing crystallized glass raw materials which are highly crystallized or fully crystallized.

2. Flat grinding and polishing during 3D glass-ceramic preparation is performed as needed prior to 3D hot bending. Flat grinding and polishing rates of 3D glass-ceramics are related to hardness, and the greater the hardness, the greater the difficulty of flat grinding and polishing, and the longer the time required. The present disclosure uses partially crystallized glass raw material for flat grinding and polishing, and the hardness is lower than that of the crystallized glass raw materials which are fully crystallized, and the flat grinding and polishing process of the glass sheet is less difficult and requires less time.

3. The optical properties of the crystallized glass raw material of the present disclosure are improved, and since the softening and forming temperature of the existing crystallized glass raw materials which are fully crystallized is generally no less than 700° C., the crystals in the crystallized glass raw materials will continue to grow during the hot bending process above 700° C., and the remaining glass body will devitrify again, there is a problem of excessive devitrification, resulting in a significant decrease in the optical properties of the crystallized glass raw material after hot bending. The optical properties of the crystallized glass raw material of the present disclosure are that the 3D glass-ceramic has an average transmittance of 83-93% at a wavelength of 380-780 nm, and an average transmittance of 80-91% at a wavelength of 360-400 nm, and an absolute value of b value (yellow and blue value) is 0.2-3.0 when the thickness of the 3D glass-ceramic is 0.7 mm.

4. The control rate of dimensional accuracy of the crystallized glass raw material of the present disclosure is improved. The partially crystallized glass raw material is used for 3D hot bending, and the glass continues to be crystallized to reach the target crystallinity by heating. Although deformation occurs while the glass is crystallized in the process of hot bending, the deformation becomes smaller due to reducing the crystallization process during 3D hot bending, which is beneficial to control the dimensional accuracy of crystallized glass raw material after hot bending.

5. The yield of the crystallized glass raw material of the present disclosure is improved. If nucleated glass or glass with low initial crystallinity is used as the raw material for 3D hot bending, the raw material needs a large amount of devitrification in a short time of hot bending, and the raw material between different batches is affected by too many variables in the 3D hot bending process, which may result in poor crystal size, crystal type and crystal ratio stability between different batches. In the partially crystallized glass raw material used for 3D hot bending, the crystallinity is relatively high, the amount of crystal growth in the process of hot bending is less, reducing the influence of variable factors, so it is easier to control the stability of different batches of 3D glass-ceramics prepared from the crystallized glass raw material and improve the yield.

DETAILED DESCRIPTION OF THE INVENTION

Figure 1:
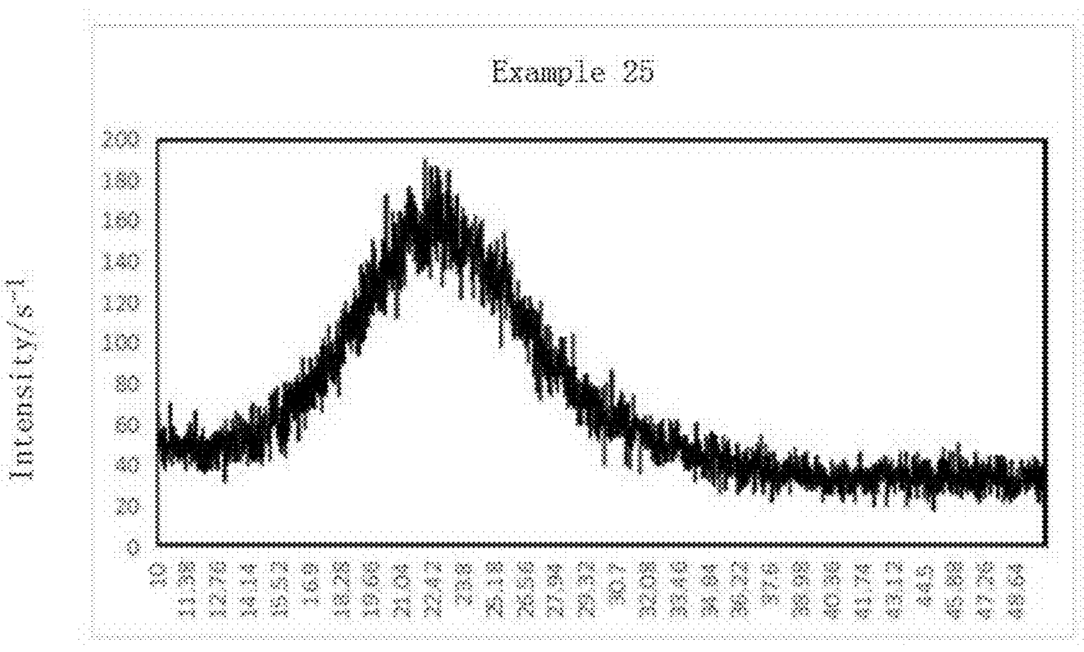
FIG. 1 is an XRD plot of a glass brick obtained in step 2 of Example 25 after annealing and before nucleation.

Provided is a crystallized glass raw material, characterized in that the crystallized glass raw material has a thickness of 0.02-5 mm, and the crystallized glass raw material has a crystallinity of 5-90 wt %.

Preferably, the thickness is 0.35-1.2 mm, and the crystallinity of the crystallized glass raw material is 30-75 wt %, 75-90 wt %, 6-10 wt %, 11-15 wt %, 16-20 wt %, 21-25 wt %, 26-30 wt %, 31-35 wt %, 36-40 wt %, 41-45 wt %, 46-50 wt %, 51-55 wt %, 56-60 wt %, 61-65 wt %, 66-70 wt %, 71-75 wt %, 76-80 wt %, 81-85 wt %, 86-90 wt %, 10-20 wt %; 21-30 wt %; 31-40 wt %; 41-50 wt %; 51-60 wt %; 61-70 wt %; 71-80 wt %; or 81-90 wt %.

Preferably, the crystallized glass raw material has an average transmittance of 83-93%, preferably 85-92% at a wavelength of light of 380-780 nm; alternatively, the crystallized glass raw material has an average transmittance of 80-91%, preferably 83-90% at a wavelength of light of 360-400 nm.

Preferably, the absolute value of b value (yellow-blue value) when the thickness of the crystallized glass raw material is 0.7 mm is 0.2-3, preferably 0.6-2; the crystallized glass raw material has a haze of 0.05-1.0%, preferably 0.2-0.8%.

Preferably, the crystallized glass raw material includes the following ratio of oxides in mol %:

| Composition | mol % |
|---|---|
| $SiO_2$ | 55%~74% |
| $Al_2O_3$ | 3%~19% |
| $B_2O_3$ | 0%~4% |
| MgO | 0%~6% |
| $Na_2O$ | 0%~3% |
| $Li_2O$ | 6%~25% |
| $K_2O$ | 0%~1% |
| CaO | 0-2% |
| ZnO | 0-5% |
| rare earth oxide | 0-3% |

wherein, the rare earth oxide being selected from one or two or more of $La_2O_3$, $Eu_2O_3$, $Pr_6O_{11}$, $Nd_2O_3$, $Er_2O_3$ and $Dy_2O_3$.

Preferably, the crystallized glass raw material contains $SiO_2$ and $Al_2O_3$ in a total amount of more than 60% in mol %; preferably 68-80%; alternatively, the crystallized glass raw material contains 7%-30%, preferably 10%-26% of $Na_2O+Li_2O$ in mol %.

Preferably, the crystallized glass raw material includes a nucleating agent, wherein, the nucleating agent comprises one or two or more of $P_2O_5$, $TiO_2$, $ZrO_2$, $Cr_2O_3$, $CaF_2$, LiF, NaF, KF, $Y_2O_3$, Au, Ag and Cu on an oxide basis or a fluoride basis or an element basis; preferred are one or two or more of $P_2O_5$, $TiO_2$ and $ZrO_2$.

Preferably, the crystallized glass raw material includes a fining agent, wherein, the fining agent comprises one or two or more of NaCl, $Na_2SO_4$, $SnO_2$, $As_2O_3$, $Sb_2O_3$, $NaNO_3$, $KNO_3$, $CeO_2$ and $(NH_4)_2SO_4$; preferred are one or two or more of NaCl, $SnO_2$, $NaNO_3$ and $CeO_2$.

Preferably, the crystallized glass raw material is crystals with an average particle size of 5-50 nm after being subjected to nucleation and crystallization.

Preferably, the crystallized glass raw material has a Vickers hardness of greater than 500 kgf/mm$^2$, and preferably greater than 560 kgf/mm$^2$, at a force load of 300 gf for 10 s.

The present disclosure also provides a preparation method of the crystallized glass raw material described above, wherein the preparation method includes the steps of:

step 1: mixing and melting raw materials for preparing the 3D glass-ceramic, and then cooling and performing an annealing processing to obtain a glass substrate;

step 2: subjecting the glass substrate obtained in step 1 to nucleation, a cleavage being able to be performed as required before or after the nucleation;

step 3: performing crystallization on the nucleated glass substrate of the step 2;

step 4: cutting the crystallized glass substrate as required to obtain a crystallized glass raw material.

Preferably, in the step 1, a melting temperature is 1350-1700° C.; preferably, the melting temperature is 1400-1650° C.; more preferably, a melt is cooled to 500-1000° C. after melting.

Preferably, the nucleating agent is added in step 1 in an amount of 1-9 mol %, more preferably an amount of 2-5 mol %, of a total amount of the nucleating agent and crystallized glass raw material oxide.

Preferably, the fining agent is added in step 1 in an amount of 0-4 wt %, preferably 0.1-2 wt % of a total mass of the nucleating agent and the crystallized glass raw material oxide.

Preferably, in the step 2, the nucleation is performed at a temperature of 450-800° C., and preferably the nucleation is performed for a time of 30-360 min.

Further preferably, the nucleation is performed at a temperature of 520-570° C., and preferably the nucleation is performed for a time of 120-300 min.

Preferably, in the step 3, the crystallization is performed at a temperature of 550-900° C., and the crystallization is performed for a time of 5-300 min.

Preferably, the crystallization is performed at a temperature of 600-850° C., and the crystallization is performed for a time of 10-240 min.

Further preferably, the crystallization is performed at a temperature of 600-750° C., and the crystallization is performed for a time of 10-150 min.

The present disclosure also provides a crystallized glass raw material prepared by the preparation method.

Preferably, the crystallized glass raw material is characterized in that the crystallized glass raw material is transparent or opaque; preferably, the crystallized glass raw material is curved or planar.

The present disclosure also provides use of the crystallized glass raw material in 3D hot bending to produce 3D glass-ceramic.

The present disclosure also provides use of the 3D glass-ceramic prepared from the crystallized glass raw material in a mobile phone display screen, a tablet computer display screen, a palm game, an electronic terminal, a portable digital device, a vehicle-mounted central control screen, an electronic whiteboard glass, a smart home touch screen, a vehicle windshield glass, an aerocraft windshield glass or an aircraft windshield glass.

Nominal Explanation:

3D glass-ceramic: glass-ceramics in which upper and lower faces are non-planar;

2D glass-ceramic: glass-ceramics in which upper and lower faces are planar;

2.5 D Glass-ceramic: glass-ceramics with one face being a plane and one face being a non-plane;

Crystallinity: the glass-ceramic contains a crystalline phase and a glassy phase, and the percentage of the mass of the crystalline phase to the total mass of the glass-ceramic is the crystallinity;

Permeability: a ratio of radiant energy projected and transmitted through the object to total radiant energy projected onto the object in the process of the incident light flux leaving from an illuminated surface or a medium incident surface to the other surface;

Average transmittance: the transmission at each wavelength is measured at intervals of 10 nm in a specified wavelength range, and a sum of the measured transmission at each wavelength is divided by the number of the measured transmission at each wavelength. For example, the average transmittance at 360-400 nm is calculated as follows: the transmittance is respectively measured at 360 nm, 370 nm, 380 nm, 390 nm and 400 nm, the number of measured transmittance at 360-400 nm is 5, and the sum of the foregoing transmittance is divided by 5 to obtain the average transmittance at 360-400 nm;

Nucleation: the nucleated substance in the glass is grown into a crystal nucleus of about 5 nm by thermal processing;

Crystallization: the glass grows a certain crystal on the basis of the crystal nucleus by thermal processing;

Average particle size of crystals: based on an average of grain lengths observed in the crystallized glass raw material or 3D glass-ceramic at a magnification of 100,000-1,000,000 times. Transmission electron microscopy (model: ThermoFisher Scientific (formerly FEI) Talos F 200S) is utilized to perform observation and measurement. When measuring, it is equivalent to taking a magnified photograph of the grains at a certain position; there are limited grains in the magnified photograph area, marking the size of the limited grains according to the scale, and then averaging. The magnification in the embodiments of the disclosure is 500,000 times when measured.

b Value: b Value indicates the yellow-blue value of the material, and in the present disclosure, b value is the b value of the transmitted light, and a positive b value indicates that the material is bluish; measurement is performed using a chromatograph (model CM-3600A).

Haze: a percentage that an intensity of the transmitted light which deviates from the incident light by no less than 2.5° accounts for in the total transmitted light intensity. Measurement is performed using a chromatograph (model CM-3600A).

When the thickness of the crystallized glass raw material is 0.65 mm, the optical performance thereof is that the absolute value of the b value under D65 light source is 0.2-3.0, and preferably the absolute value of the b value under the D65 light source is 0.6-2.0; the light transmittance at a wavelength of 360 nm is 70% or more, and preferably the transmittance at a wavelength of 360 nm is 80% or more.

Nucleating agents include, but are not limited to, $P_2O_5$, $TiO_2$, $ZrO_2$, $Cr_2O_3$, $CaF_2$, LiF, NaF, KF, $Y_2O_3$, Au, Ag, and Cu and the like.

When the crystallized glass raw material which is partially crystallized is crystallized by hot bending, the crystallization speed is controllable, which is beneficial to the growth of crystals with a particle size no more than 100 nm, and the average particle size of the precipitated crystals can be ensured to be 10-100 nm by controlling the process, thereby improving the optical performance of the 3D glass-ceramic;

In other specific embodiments, the 3D hot bending process, for the partially crystallized glass raw material, the crystallization and 3D hot bending forming are performed simultaneously, and the hot bending time is generally within 30 min. Some examples show that the partially crystallized glass raw material can reach a crystallinity of 80 wt % or more through 3D hot bending for 10-20 min under a suitable process, and the optical properties meet the requirements.

A crystalline phase of the 3D glass-ceramic finally prepared from the crystallized glass raw material includes lithium silicate, lithium disilicate, β-quartz, β-quartz solid solution, petalite, β-spodumene, β-spodumene solid solution, nepheline, cordierite, mullite, apatite, zirconium dioxide, zinc spinel, magnesium aluminate spinel and rutile etc.

In order that the disclosure may be better understood, further details of the invention are set forth in the following examples.

The manufacturers of the raw materials and equipment used in the embodiment, as well as the equipment and analytical methods used for product analysis, are described as follows, wherein the chemical substances are of chemical purity grades of conventional reagents if not otherwise indicated.

The information of raw materials used in the embodiments and comparative examples is shown in Table 1.

TABLE 1

Information on raw materials and instruments used in the present disclosure

| Composition/nucleating agent (calculated as oxide, fluoride or elemental)/fining agent/instrument name | Introduction | Purity/wt % | Manufacturer |
|---|---|---|---|
| $SiO_2$ | Silica sand | 99.5 | Shanghai Sinopharm Chemical Reagent Co., Ltd. |
| $Al_2O_3$ | Alumina | 99.5 | Shanghai Sinopharm Chemical Reagent Co., Ltd. |
| $B_2O_3$ | Boric acid | 99.8 | Shanghai Sinopharm Chemical Reagent Co., Ltd. |
| | Borax | 99.5 | Shanghai Sinopharm Chemical Reagent Co., Ltd. |
| $P_2O_5$ | Ammonium phosphate | 99.5 | Shanghai Sinopharm Chemical Reagent Co., Ltd. |
| | Aluminium phosphate | 99.5 | Shanghai Sinopharm Chemical Reagent Co., Ltd. |
| MgO | Magnesium carbonate | 99.8 | Shanghai Sinopharm Chemical Reagent Co., Ltd. |
| $Na_2O$ | Sodium carbonate | 99.8 | Shanghai Sinopharm Chemical Reagent Co., Ltd. |
| $Li_2O$ | Lithium carbonate | 98 | Shanghai Sinopharm Chemical Reagent Co., Ltd. |
| $K_2O$ | Potassium carbonate | 99.5 | Shanghai Sinopharm Chemical Reagent Co., Ltd. |
| $SnO_2$ | $SnO_2$ | 99.5 | Shanghai Sinopharm Chemical Reagent Co., Ltd. |
| CaO | Calcium carbonate | 99.0 | Shanghai Sinopharm Chemical Reagent Co., Ltd. |
| ZnO | Zinc oxide | 99.0 | Shanghai Sinopharm Chemical Reagent Co., Ltd. |
| $TiO_2$ | Titanium dioxide | 99.0 | Shanghai Aladdin Biochemical Technology Co., Ltd. |
| $ZrO_2$ | Zircon sand | 99.0 | Shanghai Aladdin Biochemical Technology Co., Ltd. |
| | Zirconium dioxide | 99.5 | Shanghai Sinopharm Chemical Reagent Co., Ltd. |
| $CaF_2$ | Calcium fluoride | 99.5 | Shanghai Aladdin Biochemical Technology Co., Ltd. |
| NaF | Sodium fluoride | 99.5 | Shanghai Aladdin Biochemical Technology Co., Ltd. |
| $La_2O_3$ | $La_2O_3$ | 99.5 | Shanghai Sinopharm Chemical Reagent Co., Ltd. |
| $Eu_2O_3$ | $Eu_2O_3$ | 99.5 | Shanghai Sinopharm Chemical Reagent Co., Ltd. |

TABLE 1-continued

| Information on raw materials and instruments used in the present disclosure | | | |
|---|---|---|---|
| $Pr_6O_{11}$ | $Pr_6O_{11}$ | 99.5 | Shanghai Sinopharm Chemical Reagent Co., Ltd. |
| $Nd_2O_3$ | $Nd_2O_3$ | 99.5 | Shanghai Sinopharm Chemical Reagent Co., Ltd. |
| $Er_2O_3$ | $Er_2O_3$ | 99.5 | Shanghai Sinopharm Chemical Reagent Co., Ltd |
| $Dy_2O_3$ | $Dy_2O_3$ | 99.5 | Shanghai Sinopharm Chemical Reagent Co., Ltd. |
| $Y_2O_3$ | $Y_2O_3$ | 99.5 | Shanghai Sinopharm Chemical Reagent Co., Ltd. |
| NaCl | NaCl | 99.8 | Shanghai Sinopharm Chemical Reagent co., Ltd. |
| $SnO_2$ | $SnO_2$ | 99.5 | Shanghai Sinopharm Chemical Reagent co., Ltd. |
| $As_2O_3$ | $As_2O_3$ | 99.5 | Shanghai Sinopharm Chemical Reagent co., Ltd. |
| $Sb_2O_3$ | $Sb_2O_3$ | 99.5 | Shanghai Sinopharm Chemical Reagent co., Ltd. |
| $NaNO_3$ | $NaNO_3$ | 99.5 | Shanghai Sinopharm Chemical Reagent co., Ltd. |
| $KNO_3$ | $KNO_3$ | 99.5 | Shanghai Sinopharm Chemical Reagent co., Ltd. |
| $CeO_2$ | $CeO_2$ | 99.5 | Shanghai Sinopharm Chemical Reagent co., Ltd. |
| $(NH_4)_2SO_4$ | $(NH_4)_2SO_4$ | 99.5 | Shanghai Sinopharm Chemical Reagent co., Ltd. |
| Chromatograph | CM-3600A | | KONICA MINOLTA |
| X-ray diffractometer (XRD) | XRD-6100 | | Shimadzu Corp. |
| Whole machine drop tester | Xiangmin/XM-960 | | Xiangmin Instrument Equipment Co. Ltd. (Shenzhen City) |
| Vickers hardness tester | HV-1000CCD | | Ningbo Qichen Instrument Co. Ltd. |
| Scattered light photoelastic stress meter | SLP2000 | | Tianye Instrument Co. Ltd. (Shenzhen City) |
| High-temperature lifting furnace | SJF1750 | | Nanjing Boyuntong Instrument Co. Ltd. |
| Annealing furnace | YYX1400-40 | | Shanghai Shengli Instrument Equipment Co. Ltd. |
| Precision annealing furnace | RQSQ-16-12 | | Jiangsu Zhongya Ruiya Thermal Energy Co. Ltd. |
| Polishing machine | YF-401A | | Yifeng Machinery Co. Ltd. (Hebei Province) |
| Multi-wire cutting machine | ch5625 | | Taizhou Chenhong Numerical Control Equipment Manufacturing Co. Ltd. |
| CNC machine | CN-650 | | Shandong Chinuo Numerical Control Equipment Co. Ltd. |
| Flat mill | YJ-13B6LD | | Hunan Ningjing Machinery Co. Ltd. |
| Polishing machine | YJ-13B6PD | | Hunan Ningjing Machinery Co. Ltd. |
| 3D heat bender | DTK-DGP-3D125 | | DAEHO TECK |

EXAMPLES

The hot bending processes in the embodiments are shown in Table 2 below. For example, when the process serial number is 1, the hot bending process includes four preheating stations, three hot pressing stations, and two cooling stations. A temperature of the first preheating station is 430° C., a temperature of the second preheating station is 500° C., a temperature of the third preheating station is 600° C., and a temperature of the fourth preheating station is 680° C. A temperature of the first hot pressing station is 800° C., an upper pressure is 0.4 MPa, and a lower pressure is 0.4 MPa; a temperature of the second hot pressing station is 810° C., an upper pressure is 0.4 MPa, and a lower pressure is 0.4 MPa; a temperature of the third hot pressing station is 600° C., an upper pressure is 0.4 MPa and a lower pressure is 0.4 MPa. A temperature of the first cooling station is 450° C. and a temperature of the second cooling station is 300° C. A working time of each of the preheating station, the hot pressing station and the cooling station is the same and is 20 s.

For example, when the serial number is 12, the hot bending process is that the hot bending process includes four preheating stations, three hot pressing stations, and two cooling stations. A temperature of the first preheating station is 430° C., a temperature of the second preheating station is 500° C., a temperature of the third preheating station is 700° C., and a temperature of the fourth preheating station is 850° C. A temperature of the first hot pressing station is 780° C., an upper pressure is 0.1 MPa, and a lower pressure is 0.1 MPa; a temperature of the second hot pressing station is 760° C., an upper pressure is 0.1 MPa, and a lower pressure is 0.1 MPa; a temperature of the third hot pressing station is 600° C., an upper pressure is 0.1 MPa and a lower pressure is 0.1 MPa. A temperature of the first cooling station is 450° C. and a temperature of the second cooling station is 300° C. A working time of each of the preheating station, the hot pressing station and the cooling station is the same and is 90 s. This is listed here.

TABLE 2

Hot bending process table in embodiments and comparative examples

| Processes Serial Number | Various stations Time | Preheating station 1 Temperature/ ° C. | Temperature of preheating station 2/° C. | Temperature of preheating station 3/° C. | Temperature of preheating station 4/° C. | Temperature of preheating station 5/° C. | Temperature of hot pressing station 1/° C. |
|---|---|---|---|---|---|---|---|
| 1 | 20 s | 430 | 500 | 600 | 680 | | 800 |
| 2 | 20 s | 520 | 660 | 680 | 720 | | 740 |
| 3 | 40 s | 430 | 500 | 600 | 680 | | 850 |
| 4 | 40 s | 430 | 500 | 600 | 680 | | 850 |
| 5 | 60 s | 450 | 600 | 650 | 700 | | 720 |
| 6 | 60 s | 450 | 600 | 650 | 710 | | 730 |
| 7 | 80 s | 480 | 630 | 680 | 710 | | 740 |
| 8 | 80 s | 480 | 635 | 685 | 715 | | 745 |
| 9 | 90 s | 480 | 630 | 680 | 710 | | 750 |
| 10 | 90 s | 480 | 630 | 680 | 710 | | 760 |
| 11 | 90 s | 480 | 630 | 680 | 710 | | 740 |
| 12 | 90 s | 430 | 500 | 700 | 850 | | 780 |
| 13 | 90 s | 450 | 600 | 650 | 710 | | 720 |
| 14 | 90 s | 450 | 600 | 650 | 720 | | 750 |
| 15 | 90 s | 450 | 600 | 650 | 740 | | 770 |
| 16 | 90 s | 480 | 600 | 650 | 720 | | 940 |
| 17 | 90 s | 450 | 600 | 650 | 720 | | 930 |
| 18 | 90 s | 450 | 500 | 650 | 650 | | 580 |
| 19 | 90 s | 500 | 550 | 600 | | | 600 |
| 20 | 140 s | 450 | 600 | 650 | | | 760 |
| 21 | 140 s | 430 | 500 | 600 | 680 | 720 | 745 |

| Processes Serial Number | Temperature of hot pressing station 2/° C. | Temperature of hot pressing station 3/° C. | Temperature of hot pressing station 4/° C. | Temperature of cooling station 1/° C. | Temperature of cooling station 2/° C. | Pressures at hot pressing stations 1-3/MPa |
|---|---|---|---|---|---|---|
| 1 | 810 | 600 | | 450 | 300 | Upper pressure of 0.4 MPa on hot pressing stations 1, 2, 3, lower pressure of 0.4 MPa on hot pressing stations 1, 2, 3 |
| 2 | 760 | 600 | | 450 | 300 | Upper pressure of 0.4 MPa, lower pressure of 0.3 MPa on hot pressing station 1 |
| 3 | 850 | 700 | | 450 | 300 | Upper pressure of 0.3 MPa, lower pressure of 0.3 MPa on hot pressing station 1 |
| 4 | 800 | 700 | | 450 | 300 | Upper pressure of 0.7 MPa, lower pressure of 0.3 MPa on hot pressing station 1 |
| 5 | 730 | 600 | | 450 | 300 | Upper pressure of 0.3 MPa, lower pressure of 0.3 MPa on hot pressing station 1 |
| 6 | 740 | 600 | | 450 | 300 | Upper pressure of 0.3 MPa, lower pressure of 0.3 MPa on hot pressing station 1 |
| 7 | 760 | 600 | | 450 | 300 | Upper pressure of 0.8 MPa, lower pressure of 0.3 MPa on hot pressing station 1 |
| 8 | 760 | 600 | | 450 | 300 | Upper pressure of 0.3 MPa, lower pressure of 0.6 MPa on hot pressing station 1 |
| 9 | 780 | 600 | | 450 | 300 | Upper pressure of 0.5 MPa, lower pressure of 0.5 MPa on hot pressing station 1 |
| 10 | 730 | 600 | | 450 | 300 | Upper pressure of 0.3 MPa, lower pressure of 0.3 MPa on hot pressing station 1 |
| 11 | 760 | 600 | | 450 | 300 | Upper pressure of 0.6 MPa on hot pressing stations 2, 3, lower pressure of 0.5 MPa on hot pressing stations 2, 3 |

TABLE 2-continued

| Hot bending process table in embodiments and comparative examples | | | | | | |
|---|---|---|---|---|---|---|
| 12 | 760 | 600 | | 450 | 300 | Upper pressure of 0.1 MPa on hot pressing stations 1, 2, 3, lower pressure of 0.1 MPa on hot pressing stations 1, 2, 3 |
| 13 | 720 | 600 | | 450 | 300 | Upper pressure of 0.3 MPa, lower pressure of 0.3 MPa on hot pressing station 1 |
| 14 | 760 | 600 | | 450 | 300 | Upper pressure of 0.1 MPa on hot pressing stations 1, 2, lower pressure of 0.1 MPa on hot pressing stations 1, 2 |
| 15 | 760 | 600 | | 450 | 300 | Upper pressure of 0.1 MPa on hot pressing stations 1, 2, lower pressure of 0.1 MPa on hot pressing stations 1, 2 |
| 16 | 920 | 600 | | 450 | 300 | Upper pressure of 0.1 MPa on hot pressing stations 1, 2, lower pressure of 0.1 MPa on hot pressing stations 1, 2 |
| 17 | 920 | 600 | | 450 | 300 | Upper pressure of 0.1 MPa on hot pressing stations 1, 2, lower pressure of 0.1 MPa on hot pressing stations 1, 2 |
| 18 | 600 | 600 | | 450 | 300 | Upper pressure of 0.1 MPa on hot pressing stations 1, 2, lower pressure of 0.1 MPa on hot pressing stations 1, 2 |
| 19 | 580 | 550 | | 450 | 300 | Upper pressure of 0.1 MPa on hot pressing stations 1, 2, lower pressure of 0.1 MPa on hot pressing stations 1, 2 |
| 20 | 750 | 720 | 600 | 450 | 300 | Upper pressure of 0.1 MPa on hot pressing stations 1, 2, 3, lower pressure of 0.1 MPa on hot pressing stations 1, 2, 3 |
| 21 | 760 | 600 | | 450 | 300 | Upper pressure of 0.5 MPa, lower pressure of 0.5 MPa on hot pressing station 1 |

The examples and comparative examples are preparation methods of a crystallized glass raw material and a method for continuously preparing a 3D glass-ceramic using the crystallized glass raw material.

Example 1 step 1: preparing and weighing the raw materials for the preparation of glass (in mole percent, containing the following components: $SiO_2$ of 62.00%; $Al_2O_3$ of 17.00%; MgO of 2.50%; $Na_2O$ of 2.50%; $Li_2O$ of 10.00%; $B_2O_3$ of 2.00%; rare earth oxide $La_2O_3$ of 0.8%, nucleating agent (containing $P_2O_5$ of 2.00%; $ZrO_2$ of 1.20%), and 0.8 wt % of a fining agent NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1650° C., and a melting time is 5 h, pouring same into a mould (both the latter examples and the comparative examples use the same mould as in Example 1) made of ASTM SA213/TP310S austenitic chromium-nickel stainless steel to obtain a glass brick;

step 2: after cooling the glass brick obtained in step 1 to 800° C., transferring same to an annealing furnace for annealing (after the annealing process is maintaining at a temperature of 620° C. for 5 h, reducing the temperature to 30° C. by 1° C./min), and then transferring same to a precision annealing furnace for nucleation, wherein a temperature of nucleation is 760° C., and a time of nucleation is 120 min;

step 3: continuing the crystallization of the nucleated glass brick in a precision annealing furnace, wherein a crystallization temperature is 790° C. and a crystallization time is 10 min, so as to obtain a glass brick after partial crystallization;

step 4: after the partially crystallized glass brick has been edged by a polishing machine, using a multi-wire cutting machine to cut into pieces, using a CNC machine tool to machine a glass sheet with a long width and a thickness of 158*75*0.65 mm, and then using a flat mill and a polishing machine to perform rough grinding and polishing respectively to obtain a partially crystallized original glass sheet (namely the crystallized glass raw material), wherein the crystallinity thereof is determined to be 10 wt % and the average particle size of the crystals is determined to be 12 nm; when the light source is defined as D65, the absolute value of the b value of the partially crystallized original glass sheet is 1.61; the transmittance of light at a wavelength of 360 nm is 80.14%, an average transmittance of light at a wavelength of 380-780 nm is 88.90%, the average transmittance of light at a wavelength of 360-400 nm is 81.74%, and the haze is 0.25%.

step 5: (i.e. continuing to prepare a 3D glass-ceramic from the crystallized glass raw material) subjecting the partially crystallized original glass sheet to 3D hot bending, the hot bending process including four preheating stations, three hot pressing stations, and two cooling stations. A temperature of the first preheating station is 430° C., a temperature of the second preheating station is 500° C., a temperature of the third preheating station is 600° C., and a temperature of the fourth preheating station is 680° C. A temperature of the first hot pressing station is 800° C., an upper pressure is 0.4 MPa, and a lower pressure is 0.4 MPa; a temperature of the second hot pressing station is 810° C., an upper pressure is 0.4 MPa, and a lower pressure is 0.4 MPa; a temperature of the third hot pressing station is 600° C., an upper pressure is 0.4 MPa and a lower pressure is 0.4 MPa. A temperature of the first cooling station is 450° C. and a temperature of the second cooling station is 300° C. A working time of each of the preheating station, the hot pressing station and the cooling station is the same and is 20 s. (i.e. using the hot bending process with the serial number 1 in table 2) obtaining a 3D glass-ceramic sample 1.

The above-mentioned 3D glass-ceramic sample 1 is detected, and the X-ray diffraction data after detection is analyzed using a ray diffractometer with the diffractometer set at a voltage of 40 mV and a current of 30 mA, a test range of 10-50°, a scanning speed of 1°/min, and a step size of 0.02°/step, wherein the crystallinity of the 3D glass-ceramic sample 1 is 15 wt %, the precipitated crystal phase is β-spodumene, and the average particle size of the crystal is 37 nm. When a light source is defined as D65, the absolute value of the b value of the 3D glass-ceramic sample 1 is 2.30; the transmittance of light at a wavelength of 360 nm is 76.30%, the average transmittance of light at a wavelength of 380-780 nm is 88.20%, the average transmittance of light at a wavelength of 360-400 nm is 80.10%, and the haze is 0.40%.

step 6: subjecting the hot-bent 3D glass-ceramic obtained in step 5 to chemical strengthening, and immersing the glass in a molten of 100 wt % $NaNO_3$ solution at a temperature of 430° C. for 8 hours to finally obtain a finished 3D glass-ceramic product 1.

Example 2 step 1: preparing and weighing the raw materials for the preparation of glass (in mole percent, containing the following components: $SiO_2$ of 64.00%; $Al_2O_3$ of 17.00%; $Na_2O$ of 2.50%; $Li_2O$ of 12.5%; $B_2O_3$ of 2.00%, nucleating agent ($P_2O_5$ of 0.80%; $ZrO_2$ of 1.20%), and 0.8 wt % of a fining agent NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1650° C., and a melting time is 5 h, pouring same into a mould made of ASTM SA213 to obtain a glass brick;

step 2 and step 3 which are the same as those in Example 1;

step 4 the process of trimming, cutting into pieces, rough grinding and polishing are the same as that in Example 1. After determination, the crystallinity thereof is 13 wt %, and the average particle size of the crystals is 1 nm; when the light source is defined as D65, the absolute value of the b value of the partially crystallized glass original slice is 1.52; the light transmission at a wavelength of 360 nm is 81.24%, the average light transmission at a wavelength of 380-780 nm is 91.20%, the average light transmission at a wavelength of 360-400 nm is 83.52%, and the haze is 0.19%.

step 5: subjecting the partially crystallized original glass sheet to 3D hot bending; and obtaining a 3D glass-ceramic sample 2 by using a hot bending process with the serial number 1 in table 2 (reference can be made to Example 1).

The above-mentioned 3D glass-ceramic sample 2 is tested, and the X-ray diffraction data after the test is analyzed using a ray diffractometer under the same instrument setting conditions as in example 1, wherein the crystallinity of the 3D glass-ceramic sample 2 after hot bending is 24 wt %, the precipitated crystal phase is β-spodumene, and the average particle size of the crystal is 27 nm. When a light source is defined as D65, the absolute value of the b value of the 3D glass-ceramic sample 2 is 3.10; the transmittance of light at a wavelength of 360 nm is 76.00%, the average transmittance of light at a wavelength of 380-780 nm is 88.00%, the average transmittance of light at a wavelength of 360-400 nm is 78.00%, and the haze is 0.43%.

step 6: subjecting the hot-bent 3D glass-ceramic obtained in step 5 to chemical strengthening under the same conditions as in Example 1, and finally obtaining a finished 3D glass-ceramic product 2.

Example 3 step 1: preparing and weighing the raw materials for the preparation of glass (in mole percent, containing the following components: $SiO_2$ of 63.64%; $Al_2O_3$ of 16.03%; $Li_2O$ of 16.03%; $B_2O_3$ of 2.00%, nucleating agent (containing $P_2O_5$ of 0.80%; $ZrO_2$ of 1.50%), and 0.8 wt % of a fining agent NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 610° C. for 5 h, reducing the temperature to 30° C. by 1° C./min), and then transferring same to a precision annealing furnace for nucleation, wherein a temperature of nucleation is 705° C., and a time of nucleation is 120 min;

step 3: continuing the crystallization of the nucleated glass brick in a precision annealing furnace, wherein a crystallization temperature is 775° C. and a crystallization time is 10 min, so as to obtain a glass brick after partial crystallization;

step 4 the process of trimming, cutting into pieces, rough grinding and polishing are the same as that in Example 1. After determination, the crystallinity thereof is 9 wt %, and the average particle size of the crystals is 16 nm; when the light source is defined as D65, the absolute value of the b value of the partially crystallized glass original slice is 1.3; the light transmission at a wavelength of 360 nm is 83.36%, the average light transmission at a wavelength of 380-780 nm is 91.30%, the average light transmission at a wavelength of 360-400 nm is 85.44%, and the haze is 0.13%.

step 5: subjecting the partially crystallized original glass sheet to 3D hot bending; and obtaining a 3D glass-ceramic sample 3 by using a hot bending process with the serial number 1 in table 2 (reference can be made to Example 1).

The above-mentioned 3D glass-ceramic sample 3 is tested, and the X-ray diffraction data after the test is analyzed using a ray diffractometer under the same instrument setting conditions as in example 1, wherein the crystallinity of the 3D glass-ceramic sample 3 after hot bending is 18 wt %, the precipitated crystal phase is β-quartz solid solution, and the average particle size of the crystal is 24 nm. When a light source is defined as D65, the absolute value of the b value of the 3D glass-ceramic sample 3 is 1.21; the transmittance of light at a wavelength of 360 nm is 83.71%, the average transmittance of light at a wavelength of 380-780 nm is 90.22%, the average transmittance of light at a wavelength of 360-400 nm is 84.56%, and the haze is 0.16%.

Example 4 step 1: preparing and weighing the raw materials for the preparation of glass (in mole percent, containing the following components: $SiO_2$ of 66.63%; $Al_2O_3$ of 15.13%; MgO of 4.76%; $Na_2O$ of 1.55%; $Li_2O$ of 8.65%; rare earth oxide $La_2O_3$ of 0.81%; nucleating agent (containing $P_2O_5$ of 0.67%; $ZrO_2$ of 1.30%, $Y_2O_3$ of 0.50%), and 0.8 wt % of NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 610° C. for 5 h, reducing the temperature to 30° C. by 1° C./min), and then transferring same to a precision annealing furnace for nucleation, wherein a temperature of nucleation is 720° C., and a time of nucleation is 120 min;

step 3: continuing the crystallization of the nucleated glass brick in a precision annealing furnace, wherein a crystallization temperature is 780° C. and a crystallization time is 10 min, so as to obtain a glass brick after partial crystallization;

step 4 the process of trimming, cutting into pieces, rough grinding and polishing are the same as that in Example 1. After determination, the crystallinity thereof is 11 wt %, and the average particle size of the crystals is 16 nm; when the light source is defined as D65, the absolute value of the b value of the partially crystallized glass original slice is 1.33; the light transmission at a wavelength of 360 nm is 82.65%, the average light transmission at a wavelength of 380-780 nm is 90.60%, the average light transmission at a wavelength of 360-400 nm is 84.73%, and the haze is 0.24%.

step 5: subjecting the partially crystallized original glass sheet to 3D hot bending; and obtaining a 3D glass-ceramic sample 4 by using a hot bending process with the serial number 1 in table 2 (reference can be made to Example 1).

The above-mentioned 3D glass-ceramic sample 4 is tested, and the X-ray diffraction data after the test is analyzed using a ray diffractometer under the same instrument setting conditions as in example 1, wherein the crystallinity of the 3D glass-ceramic sample 4 after hot bending is 23 wt %, the precipitated crystal phase is β-quartz solid solution, and the average particle size of the crystal is 27 nm. When a light source is defined as D65, the absolute value of the b value of the 3D glass-ceramic sample 4 is 1.48; the transmittance of light at a wavelength of 360 nm is 80.06%, the average transmittance of light at a wavelength of 380-780 nm is 89.5%, the average transmittance of light at a wavelength of 360-400 nm is 83.50%, and the haze is 0.25%.

step 6: subjecting the hot-bent 3D glass-ceramic obtained in step 5 to chemical strengthening, and immersing the glass in a molten of 100 wt % $NaNO_3$ solution at a temperature of 450° C. for 7 hours to finally obtain a finished 3D glass-ceramic product 4.

Example 5 step 1: preparing and weighing the raw materials for the preparation of glass (in mole percent, containing the following components: $SiO_2$ of 66.96%; $Al_2O_3$ of 14.20%; MgO of 4.79%; $Na_2O$ of 0.56%; $Li_2O$ of 9.70%; rare earth oxide $Er_2O_3$ of 0.81%; nucleating agent ($P_2O_5$ of 1.68%; $ZrO_2$ of 1.30%), and 0.4 wt % of NaCl and 0.4 wt % of $SnO_2$ in the total mass of the nucleating agent and the raw materials for preparation as a fining agent, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 and step 3 which are the same as those in Example 4;

step 4 the process of trimming, cutting into pieces, rough grinding and polishing are the same as that in Example 1. After determination, the crystallinity thereof is 16 wt %, and the average particle size of the crystals is 18 nm; when the light source is defined as D65, the absolute value of the b value of the partially crystallized glass original slice is 1.42; the light transmission at a wavelength of 360 nm is 81.35%, the average light transmission at a wavelength of 380-780 nm is 91.12%, the average light transmission at a wavelength of 360-400 nm is 84.04%, and the haze is 0.26%.

step 5: subjecting the partially crystallized original glass sheet to 3D hot bending; and obtaining a 3D glass-ceramic sample 5 by using a hot bending process with the serial number 1 in table 2 (reference can be made to Example 1).

The above-mentioned 3D glass-ceramic sample 5 is tested, and the X-ray diffraction data after the test is analyzed using a ray diffractometer under the same instrument setting conditions as in example 1, wherein the crystallinity of the 3D glass-ceramic sample 5 after hot bending is 33 wt %, the precipitated crystal phase is β-quartz solid solution and β-spodumene, and the average particle size of the crystal is 22 nm. When a light source is defined as D65, the absolute value of the b value of the 3D glass-ceramic sample 5 is 3.24; the transmittance of light at a wavelength of 360 nm is 72.00%, the average transmittance of light at a wavelength of 380-780 nm is 88.90%, the average transmittance of light at a wavelength of 360-400 nm is 78.60%, and the haze is 0.54%.

Example 6 step 1: preparing and weighing the raw materials for the preparation of glass (in mole percent, containing the following components: $SiO_2$ of 66.95%; $Al_2O_3$ of 14.20%; MgO of 2.29%; $Na_2O$ of 1.56%; ZnO of 1.00%, $Li_2O$ of 9.70%; rare earth oxide $La_2O_3$ of 0.81%; nucleating agent (containing $P_2O_5$ of 1.68%; $ZrO_2$ of 1.31%, $Y_2O_3$ of 0.5%), and 0.8 wt % of a fining agent NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 which is the same as that in Example 4;

step 3: continuing the crystallization of the nucleated glass brick in a precision annealing furnace, wherein a crystallization temperature is 765° C. and a crystallization time is 20 min, so as to obtain a glass brick after partial crystallization;

step 4 the process of trimming, cutting into pieces, rough grinding and polishing are the same as that in Example 1. After determination, the crystallinity thereof is 12 wt %, and the average particle size of the crystals is 23 nm; when the light source is defined as D65, the absolute value of the b value of the partially crystallized glass original slice is 1.73; the light transmission at a wavelength of 360 nm is 78.02%, the average light transmission at a wavelength of 380-780 nm is 88.30%, the average light transmission at a wavelength of 360-400 nm is 80.12%, and the haze is 0.38%.

step 5: subjecting the partially crystallized original glass sheet to 3D hot bending; and obtaining a 3D glass-ceramic sample 6 by using a hot bending process with the serial number 1 in table 2 (reference can be made to Example 1).

The above-mentioned 3D glass-ceramic sample 6 is tested, and the X-ray diffraction data after the test is analyzed using a ray diffractometer under the same instrument setting conditions as in example 1, wherein the crystallinity of the 3D glass-ceramic sample 6 after hot bending is 23 wt %, the precipitated crystalline phases are β-quartz solid solution and β-spodumene, and the average particle size of the crystals is 30 nm. When a light source is defined as D65, the absolute value of the b value is 3.4; the transmittance of light at a wavelength of 360 nm is 66.30%, the average transmittance of light at a wavelength of 380-780 nm is 88.30%, the average transmittance of light at a wavelength of 360-400 nm is 76.20%, and the haze is 0.96%.

Example 7 step 1: preparing and weighing the raw materials for the preparation of glass (in mole percent, containing the following components: $SiO_2$ of 66.42%; $Al_2O_3$ of 14.09%; MgO of 4.75%; $Na_2O$ of 1.55%; $Li_2O$ of 9.62%, nucleating agent ($P_2O_5$ of 0.67%; $ZrO_2$ of 1.3%; $TiO_2$ of 1.6%), and 0.8 wt % of NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 which is the same as that in Example 4;

step 3: continuing the crystallization of the nucleated glass brick in a precision annealing furnace, wherein a crystallization temperature is 750° C. and a crystallization time is 20 min, so as to obtain a glass brick after partial crystallization;

step 4 the process of trimming, cutting into pieces, rough grinding and polishing are the same as that in Example 1. After determination, the crystallinity thereof is 17 wt %, and the average particle size of the crystals is 12 nm; when the light source is defined as D65, the absolute value of the b value of the partially crystallized glass original slice is 1.22; the light transmission at a wavelength of 360 nm is 84.05%, the average light transmission at a wavelength of 380-780 nm is 92.70%, the average light transmission at a wavelength of 360-400 nm is 85.72%, and the haze is 0.21%.

step 5: subjecting the partially crystallized original glass sheet to 3D hot bending; and obtaining a 3D glass-ceramic sample 7 by using a hot bending process with the serial number 1 in table 2 (reference can be made to Example 1).

The above-mentioned 3D glass-ceramic sample 7 is tested, and the X-ray diffraction data after the test is analyzed using a ray diffractometer under the same instrument setting conditions as in example 1, wherein the crystallinity of the 3D glass-ceramic sample 7 after hot bending is 34 wt %, the precipitated crystal phase is β-quartz solid solution, and the average particle size of the crystal is 24 nm. When a light source is defined as D65, the absolute value of the b value of the 3D glass-ceramic sample 7 is 1.20; the transmittance of light at a wavelength of 360 nm is 83.10%, the average transmittance of light at a wavelength of 380-780 nm is 90.28%, the average transmittance of light at a wavelength of 360-400 nm is 84.62%, and the haze is 0.15%.

step 6: subjecting the hot-bent 3D glass-ceramic obtained in step 5 to chemical strengthening, and immersing the glass in a molten of 100 wt % $NaNO_3$ solution at a temperature of 430° C. for 9 hours to finally obtain a finished 3D glass-ceramic product 7.

Example 8 step 1: preparing and weighing the raw materials for the preparation of glass (in mole percent, containing the following components: $SiO_2$ of 66.95%; $Al_2O_3$ of 13.20%; CaO of 1.0%; MgO of 3.79%; $Na_2O$ of 1.56%; $Li_2O$ of 9.70%, nucleating agent (containing $P_2O_5$ of 1.68%; $ZrO_2$ of 1.51%; $TiO_2$ of 0.61%), and 0.7 wt % of a fining agent NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 570° C. for 5 h, reducing the temperature to 30° C. by 1° C./min), and then transferring same to a precision annealing furnace for nucleation, wherein a temperature of nucleation is 715° C., and a time of nucleation is 200 min;

step 3: continuing the crystallization of the nucleated glass brick in a precision annealing furnace, wherein a crystallization temperature is 820° C. and a crystallization time is 10 min, so as to obtain a glass brick after partial crystallization;

step 4 the process of trimming, cutting into pieces, rough grinding and polishing are the same as that in Example 1. After determination, the crystallinity thereof is 28 wt %, and the average particle size of the crystals is 23 nm; when the light source is defined as D65, the absolute value of the b value of the partially crystallized glass original slice is 1.18; the light transmission at a wavelength of 360 nm is 85.11%, the average light transmission at a wavelength of 380-780 nm is 92.90%, the average light transmission at a wavelength of 360-400 nm is 88.01%, and the haze is 0.12%.

step 5: subjecting the partially crystallized original glass sheet to 3D hot bending, the hot bending process including four preheating stations, three hot pressing stations, and two cooling stations. A temperature of the first preheating station is 480° C., a temperature of the second preheating station is 635° C., a temperature of the third preheating station is 685° C., and a temperature of the fourth preheating station is 715° C. A temperature of the first hot pressing station is 745° C., an upper pressure is 0.3 MPa, and a lower pressure is 0.6 MPa; a temperature of the second hot pressing station is 760° C., an upper pressure is 0 MPa, and a lower pressure is 0 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 80 s. (i.e. using the hot bending process with the serial number 8 in table 2) obtaining a 3D glass-ceramic sample 8.

The above-mentioned 3D glass-ceramic sample 8 is tested, and the X-ray diffraction data after the test is analyzed using a ray diffractometer under the same instrument setting conditions as in example 1, wherein the crystallinity of the 3D glass-ceramic sample 8 after hot bending is 45 wt %, the precipitated crystalline phases are β-quartz solid solution and β-spodumene, and the average particle size of the crystals is 37 nm. When a light source is defined as D65, the absolute value of the b value of the 3D glass-ceramic sample 8 is 2.90; the transmittance of light at a wavelength of 360 nm is 76.11%, the average transmittance of light at a wavelength of 380-780 nm is 88.10%, the average transmittance of light at a wavelength of 360-400 nm is 78.80%, and the haze is 0.63%.

Example 9 step 1: preparing and weighing the raw materials for the preparation of glass (in mole percent, containing the following components: $SiO_2$ of 66.96%; $Al_2O_3$ of 13.20%; MgO of 5.79%; $Na_2O$ of 1.26%; $Li_2O$ of 8.00%; $B_2O_3$ of 1.00%; rare earth oxide $Er_2O_3$ of 0.9%; nucleating agent ($P_2O_5$ of 1.68%; $ZrO_2$ of 1.21%), and 0.7 wt % of a fining agent NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 and step 3 which are the same as those in Example 8;

step 4 the process of trimming, cutting into pieces, rough grinding and polishing are the same as that in Example 1. After determination, the crystallinity thereof is 19 wt %, and the average particle size of the crystals is 14 nm; when the light source is defined as D65, the absolute value of the b value of the partially crystallized glass original slice is 1.23; the light transmission at a wavelength of 360 nm is 84.21%, the average light transmission at a wavelength of 380-780 nm is 92.40%, the average light transmission at a wavelength of 360-400 nm is 85.83%, and the haze is 0.16%.

step 5: subjecting the partially crystallized original glass sheet to 3D hot bending; and obtaining a 3D glass-ceramic sample 9 by using a hot bending process with the serial number 8 in table 2 (reference can be made to Example 8).

The above-mentioned 3D glass-ceramic sample 9 is tested, and the X-ray diffraction data after the test is analyzed using a ray diffractometer under the same instrument setting conditions as in example 1, wherein the crystallinity of the 3D glass-ceramic sample 9 after hot bending is 32 wt %, the precipitated crystal phase is β-quartz solid solution, and the average particle size of the crystal is 24 nm. When a light source is defined as D65, the absolute value of the b value of the 3D glass-ceramic sample 9 is 1.30; the transmittance of light at a wavelength of 360 nm is 82.10%, the average transmittance of light at a wavelength of 380-780 nm is 89.40%, the average transmittance of light at a wavelength of 360-400 nm is 85.20%, and the haze is 0.21%.

Example 10 step 1: preparing and weighing the raw materials for the preparation of glass (in mole percent, containing the following components: $SiO_2$ of 71.65%; $Al_2O_3$ of 13.20%; MgO of 2.79%; $Na_2O$ of 0.56%; $Li_2O$ of 8.00%; rare earth oxide $Er_2O_3$ of 0.610%; nucleating agent ($P_2O_5$ of 1.68%; $ZrO_2$ of 1.51%), and 0.7 wt % of NaCl in the total mass of the nucleating agent and the raw materials for preparation, the total weight of the above-mentioned raw materials is 1711.9 g), and after sufficient mixing, melting and forming in a high-temperature lifting furnace), a temperature of the melting and forming is 1630° C., and a melting time is 5 h, pouring same into a mould made of ASTM SA213 to obtain a glass brick;

step 2 which is the same as that in Example 8;

step 3: continuing the crystallization of the nucleated glass brick in a precision annealing furnace, wherein a crystallization temperature is 800° cand a crystallization time is 10 min, so as to obtain a glass brick after partial crystallization;

step 4 the process of trimming, cutting into pieces, rough grinding and polishing are the same as that in Example 1. After determination, the crystallinity thereof is 20 wt %, and the average particle size of the crystals is 16 nm; when the light source is defined as D65, the absolute value of the b value of the partially crystallized glass original slice is 1.2; the light transmission at a wavelength of 360 nm is 84.33%, the average light transmission at a wavelength of 380-780 nm is 92.60%, the average light transmission at a wavelength of 360-400 nm is 85.60%, and the haze is 0.22%.

step 5: subjecting the partially crystallized original glass sheet to 3D hot bending; and obtaining a 3D glass-ceramic sample 10 by using a hot bending process with the serial number 8 in table 2 (reference can be made to Example 8).

The above-mentioned 3D glass-ceramic sample 10 is tested, and the X-ray diffraction data after the test is analyzed using a ray diffractometer under the same instrument setting conditions as in example 1, wherein the crystallinity of the 3D glass-ceramic sample 10 after hot bending is 37 wt %, the precipitated crystal phase is β-quartz solid solution, and the average particle size of the crystal is 27 nm. When a light source is defined as D65, the absolute value of the b value is 1.60; the transmittance of light at a wavelength of 360 nm is 81.13%, the average transmittance of light at a wavelength of 380-780 nm is 89.60%, the average transmittance of light at a wavelength of 360-400 nm is 82.80%, and the haze is 0.19%.

Example 11 step 1: preparing and weighing the raw materials for the preparation of glass (in mole percent, containing the following components: $SiO_2$ of 70.65%; $Al_2O_3$ of 13.20%; MgO of 2.79%; $Na_2O$ of 1.56%; $Li_2O$ of 8.00%; rare earth oxide $La_2O_3$ of 0.61%; nucleating agent ($P_2O_5$ of 1.68%; $ZrO_2$ of 1.51%), and 0.7 wt % of NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 and step 3 which are the same as those in Example 10;

step 4 the process of trimming, cutting into pieces, rough grinding and polishing are the same as that in Example 1. After determination, the crystallinity thereof is 21 wt %, and the average particle size of the crystals is 10 nm; when the light source is defined as D65, the absolute value of the b value of the partially crystallized glass original slice is 1.16; the light transmission at a wavelength of 360 nm is 85.33%, the average light transmission at a wavelength of 380-780 nm is 92.50%, the average light transmission at a wavelength of 360-400 nm is 88.46%, and the haze is 0.10%.

step 5: subjecting the partially crystallized original glass sheet to 3D hot bending; and obtaining a 3D glass-ceramic sample 11 by using a hot bending process with the serial number 8 in table 2 (reference can be made to Example 8).

The above-mentioned 3D glass-ceramic sample 11 is tested, and the X-ray diffraction data after the test is analyzed using a ray diffractometer under the same instrument setting conditions as in example 1, wherein the crystallinity of the 3D glass-ceramic sample 11 after hot bending is 41 wt %, the precipitated crystal phase is β-quartz solid solution, and the average particle size of the crystal is 22 nm. After determination, when the light source is defined as D65, the absolute value of b value is 1.10; the transmittance of light at a wavelength of 360 nm is 82.40%, the average transmittance of light at a wavelength of 380-780 nm is 90.60%, the average transmittance of light at a wavelength of 360-400 nm is 85.30%, and the haze is 0.13%.

Example 12 step 1: preparing and weighing the raw materials for the preparation of glass (in mole percent, containing the following components: $SiO_2$ of 70.65%; $Al_2O_3$ of 12.92%; MgO of 2.42%; ZnO of 0.80%; $Na_2O$ of 1.05%; $Li_2O$ of 8.25%; rare earth oxide $La_2O_3$ of 1.22%; nucleating agent ($P_2O_5$ of 1.37%; $Y_2O_3$ of 1.32%), and 0.3 wt % of $NaNO_3$ and 0.4 wt % of $As_2O_3$ in the total mass of the nucleating agent and the raw materials for preparation as a fining agent, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of SA213 to obtain a glass brick;

step 2: after cooling the glass brick obtained in step 1 to 800° C., transferring same to an annealing furnace for annealing (after the annealing process is maintaining at a temperature of 570° C. for 5 h, reducing the temperature to 30° C. by 1° C./min), and then transferring same to a precision annealing furnace for nucleation, wherein a temperature of nucleation is 700° C., and a time of nucleation is 200 min;

step 3 which is the same as that in Example 5;

step 4 the process of trimming, cutting into pieces, rough grinding and polishing are the same as that in Example 1. After determination, the crystallinity thereof is 25 wt %, and the average particle size of the crystals is 16 nm; when the light source is defined as D65, the absolute value of the b value of the partially crystallized glass original slice is 0.92; the light transmission at a wavelength of 360 nm is 86.03%, the average light transmission at a wavelength of 380-780 nm is 92.80%, the average light transmission at a wavelength of 360-400 nm is 88.22%, and the haze is 0.13%.

step 5: subjecting the partially crystallized original glass sheet to 3D hot bending; and obtaining a 3D glass-ceramic sample 12 by using a hot bending process with the serial number 8 in table 2 (reference can be made to Example 8).

The above-mentioned 3D glass-ceramic sample 12 is tested, and the X-ray diffraction data after the test is analyzed using a ray diffractometer under the same instrument setting conditions as in example 1, wherein the crystallinity of the 3D glass-ceramic sample 12 after hot bending is 43 wt %, the precipitated crystal phase is β-quartz solid solution, and the average particle size of the crystal is 24 nm. After determination, when the light source is defined as D65, the absolute value of b value is 1.15; the transmittance of light at a wavelength of 360 nm is 83.68%, the average transmittance of light at a wavelength of 380-780 nm is 90.56%, the average transmittance of light at a wavelength of 360-400 nm is 86.30%, and the haze is 0.17%.

step 6: subjecting the hot-bent 3D glass-ceramic obtained in step 5 to chemical strengthening under the same conditions as in Example 7, and finally obtaining a finished 3D glass-ceramic product 12.

Example 13 step 1: preparing and weighing the raw materials for the preparation of glass (in mole percent, containing the following components: $SiO_2$ of 71.15%; $Al_2O_3$ of 12.70%; MgO of 2.79%; $Na_2O$ of 0.56%; $Li_2O$ of 8.00%; $B_2O_3$ of 1.00%; rare earth oxide $Nd_2O_3$ of 0.61%; nucleating agent ($P_2O_5$ of 1.68%; $CaF_2$ of 1.51%), and 0.7 wt % of a fining agent NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 570° C. for 5 h, reducing the temperature to 30° C. by 1° C./min), and then transferring same to a precision annealing furnace for nucleation, wherein a temperature of nucleation is 710° C., and a time of nucleation is 200 min;

step 3 which is the same as that in Example 10;

step 4 the process of trimming, cutting into pieces, rough grinding and polishing are the same as that in Example 1. After determination, the crystallinity thereof is 18 wt %, and the average particle size of the crystals is 25 nm; when the light source is defined as D65, the absolute value of the b value of the partially crystallized glass original slice is 1.02; the light transmission at a wavelength of 360 nm is 85.53%, the average light transmission at a wavelength of 380-780 nm is 92.60%, the average light transmission at a wavelength of 360-400 nm is 87.13%, and the haze is 0.18%.

step 5: subjecting the partially crystallized original glass sheet to 3D hot bending; and obtaining a 3D glass-ceramic sample 13 by using a hot bending process with the serial number 8 in table 2 (reference can be made to Example 8).

The above-mentioned 3D glass-ceramic sample 13 is tested, and the X-ray diffraction data after the test is analyzed using a ray diffractometer under the same instrument setting conditions as in example 1, wherein the crystallinity of the 3D glass-ceramic sample 13 after hot bending is 34 wt %, the precipitated crystal phase is β-quartz solid solution, and the average particle size of the crystal is 35 nm. After determination, when the light source is defined as D65, the absolute value of b value is 1.75; the transmittance of light at a wavelength of 360 nm is 81.03%, the average transmittance of light at a wavelength of 380-780 nm is 89.00%, the average transmittance of light at a wavelength of 360-400 nm is 82.30%, and the haze is 0.23%.

Example 14 step 1: preparing and weighing the raw materials for the preparation of glass (in mole percent, containing the following components: $SiO_2$ of 68.00%; $Al_2O_3$ of 12.00%; MgO of 3.5%; $Na_2O$ of 0.50%; $Li_2O$ of 10.00%; $B_2O_3$ of 3.00%; nucleating agent ($P_2O_5$ of 2.00%; $Y_2O_3$ of 1.00%), and 0.2 wt % of NaCl, 0.2 wt % of $SnO_2$ and 0.2 wt % of $CeO_2$ in the total mass of the nucleating agent and the raw materials for preparation as a fining agent, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 which is the same as that in Example 13;

step 3 which is the same as that in Example 1;

step 4 the process of trimming, cutting into pieces, rough grinding and polishing are the same as that in Example 1. After determination, the crystallinity thereof is 35 wt %, and the average particle size of the crystals is 14 nm; when the light source is defined as D65, the absolute value of the b value of the partially crystallized glass original slice is 1.52; the light transmission at a wavelength of 360 nm is 81.53%, the average light transmission at a wavelength of 380-780 nm is 91.60%, the average light transmission at a wavelength of 360-400 nm is 84.49%, and the haze is 0.25%.

step 5: subjecting the partially crystallized original glass sheet to 3D hot bending; and obtaining a 3D glass-ceramic sample 14 by using a hot bending process with the serial number 8 in table 2 (reference can be made to Example 8).

The above-mentioned 3D glass-ceramic sample 14 is tested, and the X-ray diffraction data after the test is analyzed using a ray diffractometer under the same instrument setting conditions as in example 1, wherein the crystallinity of the 3D glass-ceramic sample 14 after hot bending is 62 wt %, the precipitated crystal phase is β-quartz solid solution+petalite, and the average particle size of the crystal is 27 nm. After determination, when the light source is defined as D65, the absolute value of b value is 1.11; the transmittance of light at a wavelength of 360 nm is 84.20%, the average transmittance of light at a wavelength of 380-780 nm is 90.90%, the average transmittance of light at a wavelength of 360-400 nm is 85.80%, and the haze is 0.22%.

Example 15 step 1: preparing and weighing the raw materials for the preparation of glass (in mole percent, containing the following components: $SiO_2$ of 66.95%; $Al_2O_3$ of 11.20%; CaO of 1.20%; MgO of 4.59%; $Na_2O$ of 1.26%; $Li_2O$ of 9.00%; $B_2O_3$ of 2.00%; rare earth oxide $Nd_2O_3$ of 0.61%; nucleating agent ($P_2O_5$ of 1.68%; $ZrO_2$ of 1.51%), and 0.6 wt % of a fining agent NaCl in the total mass of the nucleating agent and the raw materials for preparation, the total weight of the above-mentioned raw materials is 1710.2 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 550° C. for 5 h, reducing the temperature to 30° C. by 1° C./min), and then transferring same to a precision annealing furnace for nucleation, wherein a temperature of nucleation is 690° C., and a time of nucleation is 200 min;

step 3: continuing the crystallization of the nucleated glass brick in a precision annealing furnace, wherein a crystallization temperature is 750° C. and a crystallization time is 30 min, so as to obtain a glass brick after partial crystallization;

step 4 the process of trimming, cutting into pieces, rough grinding and polishing are the same as that in Example 1. After determination, the crystallinity thereof is 32 wt %, and the average particle size of the crystals is 18 nm; when the light source is defined as D65, the absolute value of the b value of the partially crystallized glass original slice is 1.54; the light transmission at a wavelength of 360 nm is 81.13%, the average light transmission at a wavelength of 380-780 nm is 91.20%, the average light transmission at a wavelength of 360-400 nm is 83.43%, and the haze is 0.27%.

step 5: subjecting the partially crystallized original glass sheet to 3D hot bending; and obtaining a 3D glass-ceramic sample 15 by using a hot bending process with the serial number 8 in table 2 (reference can be made to Example 8).

The above-mentioned 3D glass-ceramic sample 15 is tested, and the X-ray diffraction data after the test is analyzed using a ray diffractometer under the same instrument setting conditions as in example 1, wherein the crystallinity of the 3D glass-ceramic sample 15 after hot bending is 53 wt %, the precipitated crystal phase is β-quartz solid solution+petalite, and the average particle size of the crystal is 24 nm. When a light source is defined as D65, the absolute value of the b value is 0.70; the transmittance of light at a wavelength of 360 nm is 85.22%, the average transmittance of light at a wavelength of 380-780 nm is 91.20%, the average transmittance of light at a wavelength of 360-400 nm is 87.50%, and the haze is 0.16%.

Example 16 step 1: preparing and weighing the raw materials for the preparation of glass (in mole percent, containing the following components: $SiO_2$ of 65.10%; $Al_2O_3$ of 8.51%; $Na_2O$ of 1.00%; $Li_2O$ of 20.83%; $B_2O_3$ of 1.52%; nucleating agent ($P_2O_5$ of 0.82%; $ZrO_2$ of 1.72%, and NaF of 0.5%), and 0.3 wt % of $NaNO_3$ and 0.3 wt % of $As_2O_3$ in the total mass of the nucleating agent and the raw materials for preparation as a fining agent, the total weight of the above-mentioned raw materials is 1710.2 g), and after sufficient mixing, melting and forming in a high-temperature lifting furnace, a temperature of the melting and forming is 1620° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 550° C. for 5 h, reducing the temperature to 30° C. by 1° C./min), and then transferring same to a precision annealing furnace for nucleation, wherein a temperature of nucleation is 670° C., and a time of nucleation is 200 min;

step 3: continuing the crystallization of the nucleated glass brick in a precision annealing furnace, wherein a crystallization temperature is 710° C. and a crystallization time is 100 min, so as to obtain a glass brick after partial crystallization;

step 4 the process of trimming, cutting into pieces, rough grinding and polishing are the same as that in Example 1. After determination, the crystallinity thereof is 40 wt %, and the average particle size of the crystals is 1 nm; when the light source is defined as D65, the absolute value of the b value of the partially crystallized glass original slice is 1.24; the light transmission at a wavelength of 360 nm is 83.13%, the average light transmission at a wavelength of 380-780 nm is 91.80%, the average light transmission at a wavelength of 360-400 nm is 86.41%, and the haze is 0.21%.

step 5: performing 3D hot bending on the partially crystallized original glass sheet, wherein the hot bending process uses hot bending process with the serial number of 6 in table 2, and the hot bending includes four preheating stations, three hot pressing stations and two cooling stations. A temperature of the first preheating station is 450° C., a temperature of the second preheating station is 600° C., a temperature of the third preheating station is 650° C., and a temperature of the fourth preheating station is 710° C. A temperature of the first hot pressing station is 730° C., an upper pressure is 0.3 MPa, and a lower pressure is 0.3 MPa; a temperature of the second hot pressing station is 740° C., an upper pressure is 0 MPa, and a lower pressure is 0 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 60 s. A 3D glass-ceramic sample 16 is obtained.

The above-mentioned 3D glass-ceramic sample 16 is tested, and the X-ray diffraction data after the test is analyzed using a ray diffractometer under the same instrument setting conditions as in example 1, wherein the crystallinity of the 3D glass-ceramic sample 16 after hot bending is 60 wt %, the precipitated crystal phase is β-quartz solid solution+petalite, and the average particle size of the crystal is 21 nm. After determination, when the light source is defined as D65, the absolute value of b value is 0.62; the transmittance of light at a wavelength of 360 nm is 86.02%, the average transmittance of light at a wavelength of 380-780 nm is 91.10%, the average transmittance of light at a wavelength of 360-400 nm is 88.10%, and the haze is 0.17%.

step 6: subjecting the hot-bent 3D glass-ceramic obtained in step 5 to chemical strengthening, and immersing the glass in a molten of 100 wt % $NaNO_3$ solution at a temperature of 430° C. for 11 hours to finally obtain a finished 3D glass-ceramic product 16.

Example 17 step 1: preparing and weighing the raw materials for the preparation of glass (in mole percent, containing the following components: $SiO_2$ of 68.00%; $Al_2O_3$ of 5.50%; CaO of 0.50%; $Na_2O$ of 1.00%; $Li_2O$ of 21.00%; $B_2O_3$ of 1.50%, nucleating agent ($P_2O_5$ of 0.80%; $ZrO_2$ of 1.70%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 500° C. for 5 h, reducing the temperature to 30° C. by 1° C./min), and then transferring same to a precision annealing furnace for nucleation, wherein a temperature of nucleation is 570° C., and a time of nucleation is 200 min;

step 3: continuing the crystallization of the nucleated glass brick in a precision annealing furnace, wherein a crystallization temperature is 640° C. and a crystallization time is 100 min, so as to obtain a glass brick after partial crystallization;

step 4 the process of trimming, cutting into pieces, rough grinding and polishing are the same as that in Example 1. After determination, the crystallinity thereof is 78 wt %, and the average particle size of the crystals is 25 nm; when the light source is defined as D65, the absolute value of the b value of the partially crystallized glass original slice is 1.16; the light transmission at a wavelength of 360 nm is 84.16%, the average light transmission at a wavelength of 380-780 nm is 91.30%, the average light transmission at a wavelength of 360-400 nm is 85.94%, and the haze is 0.19%.

step 5: subjecting the partially crystallized original glass sheet to 3D hot bending; and obtaining a 3D glass-ceramic sample 17 by using a hot bending process with the serial number 6 in table 2 (reference can be made to Example 16).

The above-mentioned 3D glass-ceramic sample 17 is tested, and the X-ray diffraction data after the test is analyzed using a ray diffractometer under the same instrument setting conditions as in example 1, wherein the crystallinity of the 3D glass-ceramic sample 17 after hot bending is 91 wt %, the precipitated crystal phase is β-quartz solid solution+petalite, and the average particle size of the crystal is 21 nm. When a light source is defined as D65, the absolute value of the b value is 1.0; the transmittance of light at a wavelength of 360 nm is 84.32%, the average transmittance of light at a wavelength of 380-780 nm is 90.80%, the average transmittance of light at a wavelength of 360-400 nm is 86.40%, and the haze is 0.16%.

Example 18 step 1: preparing and weighing the raw materials for the preparation of glass (in mole percent, containing the following components: $SiO_2$ of 69.14%; $Al_2O_3$ of 5.21%; $Na_2O$ of 0.46%; $Li_2O$ of 21.13%; $B_2O_3$ of 1.52%, nucleating agent ($P_2O_5$ of 0.82%; $ZrO_2$ of 1.72%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1550° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 490° C. for 5 h, reducing the temperature to 30° C. by 1° C./min), and then transferring same to a precision annealing furnace for nucleation, wherein a temperature of nucleation is 530° C., and a time of nucleation is 200 min;

step 3: continuing the crystallization of the nucleated glass brick in a precision annealing furnace, wherein a crystallization temperature is 640° C. and a crystallization time is 120 min, so as to obtain a glass brick after partial crystallization;

step 4 the process of trimming, cutting into pieces, rough grinding and polishing are the same as that in Example 1. After determination, the crystallinity thereof is 72 wt %, and the average particle size of the crystals is 19 nm; when the light source is defined as D65, the absolute value of the b value of the partially crystallized glass original slice is 1.44; the light transmission at a wavelength of 360 nm is 82.31%, the average light transmission at a wavelength of 380-780 nm is 91.00%, the average light transmission at a wavelength of 360-400 nm is 84.91%, and the haze is 0.24%.

step 5: performing 3D hot bending on the partially crystallized original glass sheet, wherein the hot bending process uses hot bending process with the serial number of 13 in table 2, and the hot bending includes four preheating stations, three hot pressing stations and two cooling stations. A temperature of the first preheating station is 450° C., a temperature of the second preheating station is 600° C., a temperature of the third preheating station is 650° C., and a temperature of the fourth preheating station is 710° C. A temperature of the first hot pressing station is 720° C., an upper pressure is 0.3 MPa, and a lower pressure is 0.3 MPa; a temperature of the second hot pressing station is 720° C., an upper pressure is 0 MPa, and a lower pressure is 0 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s. A 3D glass-ceramic sample 18 is obtained.

The above-mentioned 3D glass-ceramic sample 18 is tested, and the X-ray diffraction data after the test is analyzed using a ray diffractometer under the same instrument setting conditions as in example 1, wherein the crystallinity of the 3D glass-ceramic sample 18 after hot bending is 92 wt %, the precipitated crystal phase is lithium disilicate+petalite, and the average particle size of the crystal is 18 nm. When a light source is defined as D65, the absolute value of the b value is 0.43; the transmittance of light at a wavelength of 360 nm is 87.17%, the average transmittance of light at a wavelength of 380-780 nm is 92.10%, the average transmittance of light at a wavelength of 360-400 nm is 90.30%, and the haze is 0.11%.

Example 19 steps 1-2 which are the same as those of Example 18;

step 3: continuing the crystallization of the nucleated glass brick in a precision annealing furnace, wherein a crystallization temperature is 630° C. and a crystallization time is 120 min, so as to obtain a glass brick after partial crystallization;

step 4 the process of trimming, cutting into pieces, rough grinding and polishing are the same as that in Example 1. After determination, the crystallinity thereof is 60 wt %, and the average particle size of the crystals is 6 nm; when the light source is defined as D65, the absolute value of the b value of the partially crystallized glass original slice is 1.32; the light transmission at a wavelength of 360 nm is 84.00%, the average light transmission at a wavelength of 380-780 nm is 91.40%, the average light transmission at a wavelength of 360-400 nm is 85.70%, and the haze is 0.36%.

step 5: subjecting the partially crystallized original glass sheet to 3D hot bending; and obtaining a 3D glass-ceramic sample 19 by using a hot bending process with the serial number 13 in table 2 (reference can be made to Example 18).

The above-mentioned 3D glass-ceramic sample 19 is tested, and the X-ray diffraction data after the test is analyzed using a ray diffractometer under the same instrument setting conditions as in example 1, wherein the crystallinity of the 3D glass-ceramic sample 19 after hot bending is 86 wt %, the precipitated crystal phase is lithium disilicate+petalite, and the average particle size of the crystal is 19 nm. When a light source is defined as D65, the absolute value of the b value is 0.44; the transmittance of light at a wavelength of 360 nm is 87.31%, the average transmittance of light at a wavelength of 380-780 nm is 92.30%, the average transmittance of light at a wavelength of 360-400 nm is 89.50%, and the haze is 0.11%.

Example 20 steps 1-2 which are the same as those of Example 18;

step 3: continuing the crystallization of the nucleated glass brick in a precision annealing furnace, wherein a crystallization temperature is 625° C. and a crystallization time is 120 min, so as to obtain a glass brick after partial crystallization;

step 4 the process of trimming, cutting into pieces, rough grinding and polishing are the same as that in Example 1. After determination, the crystallinity thereof is 51 wt %, and the average particle size of the crystals is 13 nm; when the light source is defined as D65, the absolute value of the b value of the partially crystallized glass original slice is 1.29; the light transmission at a wavelength of 360 nm is 83.15%, the average light transmission at a wavelength of 380-780 nm is 90.80%, the average light transmission at a wavelength of 360-400 nm is 84.15%, and the haze is 0.21%;

step 5: subjecting the partially crystallized original glass sheet to 3D hot bending; and obtaining a 3D glass-ceramic sample 20 by using a hot bending process with the serial number 13 in table 2 (reference can be made to Example 18).

The above-mentioned 3D glass-ceramic sample 20 is tested, and the X-ray diffraction data after the test is analyzed using a ray diffractometer under the same instrument setting conditions as in example 1, wherein the crystallinity of the 3D glass-ceramic sample 20 after hot bending is 73 wt %, the precipitated crystal phase is lithium disilicate+petalite, and the average particle size of the crystal is 23 nm. When a light source is defined as D65, the absolute value of the b value is 0.58; the transmittance of light at a wavelength of 360 nm is 86.20%, the average transmittance of light at a wavelength of 380-780 nm is 92.10%, the average transmittance of light at a wavelength of 360-400 nm is 87.80%, and the haze is 0.10%.

Example 21

Preparation methods of a crystallized glass raw material and a method for continuously preparing a 3D glass-ceramic using the crystallized glass raw:

steps 1-2 which are the same as those of Example 18;

step 3: continuing the crystallization of the nucleated glass brick in a precision annealing furnace, wherein a crystallization temperature is 620° C. and a crystallization time is 120 min, so as to obtain a glass brick after partial crystallization;

step 4 the process of trimming, cutting into pieces, rough grinding and polishing are the same as that in Example 1. After determination, the crystallinity thereof is 30 wt %, and the average particle size of the crystals is 15 nm; when the light source is defined as D65, the absolute value of the b value of the partially crystallized glass original slice is 1.24; the light transmission at a wavelength of 360 nm is 83.02%, the average light transmission at a wavelength of 380-780 nm is 91.80%, the average light transmission at a wavelength of 360-400 nm is 84.82%, and the haze is 0.33%, step 5: subjecting the partially crystallized original glass sheet to 3D hot bending; and obtaining a 3D glass-ceramic sample 21 by using a hot bending process with the serial number 13 in table 2 (reference can be made to Example 18).

The above-mentioned 3D glass-ceramic sample 21 is tested, and the X-ray diffraction data after the test is analyzed using a ray diffractometer under the same instrument setting conditions as in example 1, wherein the crystallinity of the 3D glass-ceramic sample 21 after hot bending is 65 wt %, the precipitated crystal phase is lithium disilicate+petalite, and the average particle size of the crystal is 25 nm. After determination, when the light source is defined as D65, the absolute value of b value is 0.62; the transmittance of light at a wavelength of 360 nm is 85.14%, the average transmittance of light at a wavelength of 380-780 nm is 91.60%, the average transmittance of light at a wavelength of 360-400 nm is 88.10%, and the haze is 0.15%.

Example 22 step 1: preparing and weighing the raw materials for the preparation of glass (in mole percent, containing the following components: $SiO_2$ of 69.5%; $Al_2O_3$ of 5.3%; $Na_2O$ of 1.60%; $Li_2O$ of 20.5%; $B_2O_3$ of 0.55%, nucleating agent ($P_2O_5$ of 0.8%; $ZrO_2$ of 1.75%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1550° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 480° C. for 5 h, reducing the temperature to 30° C. by 1° C./min), and then transferring same to a precision annealing furnace for nucleation, wherein a temperature of nucleation is 560° C., and a time of nucleation is 200 min;

step 3: continuing the crystallization of the nucleated glass brick in a precision annealing furnace, wherein a crystallization temperature is 630° C. and a crystallization time is 100 min, so as to obtain a glass brick after partial crystallization;

step 4 the process of trimming, cutting into pieces, rough grinding and polishing are the same as that in Example 1. After determination, the crystallinity thereof is 39 wt %, and the average particle size of the crystals is 14 nm; when the light source is defined as D65, the absolute value of the b value of the partially crystallized glass original slice is 1.19; the light transmission at a wavelength of 360 nm is 84.92%, the average light transmission at a wavelength of 380-780 nm is 92.80%, the average light transmission at a wavelength of 360-400 nm is 88.32%, and the haze is 0.21%.

step 5: performing 3D hot bending on the partially crystallized original glass sheet, wherein the hot bending process uses hot bending process with the serial number of 15 in table 2, and the hot bending includes four preheating stations, three hot pressing stations and two cooling stations. A temperature of the first preheating station is 450° C., a temperature of the second preheating station is 600° C., a temperature of the third preheating station is 650° C., and a temperature of the fourth preheating station is 740° C. A temperature of the first hot pressing station is 770° C., an upper pressure is 0.1 MPa, and a lower pressure is 0.1 MPa; a temperature of the second hot pressing station is 760° C., an upper pressure is 0.1 MPa, and a lower pressure is 0.1 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s. A 3D glass-ceramic sample 22 is obtained.

The above-mentioned 3D glass-ceramic sample 22 is tested, and the X-ray diffraction data after the test is analyzed using a ray diffractometer under the same instrument setting conditions as in example 1, wherein the crystallinity of the 3D glass-ceramic sample 22 after hot bending is 85 wt %, the precipitated crystal phase is petalite+lithium disilicate, and the average particle size of the crystal is 19 nm. When a light source is defined as D65, the absolute value of the b value is 0.42; the transmittance of light at a wavelength of 360 nm is 88.23%, the average transmittance of light at a wavelength of 380-780 nm is 92.10%, the average transmittance of light at a wavelength of 360-400 nm is 89.30%, and the haze is 0.15%.

step 6: subjecting the hot-bent 3D glass-ceramic obtained in step 5 to chemical strengthening, and immersing the glass in a molten of 100 wt % $NaNO_3$ solution at a temperature of 450° C. for 9 hours to finally obtain a finished 3D glass-ceramic product 22.

Example 23 step 1: preparing and weighing the raw materials for the preparation of glass (in mole percent, containing the following components: $SiO_2$ of 71.80%; $Al_2O_3$ of 4.80%; MgO of 1.40%; $Na_2O$ of 1.00%; $Li_2O$ of 18.80%; ZnO of 0.3%, nucleating agent ($P_2O_5$ of 0.8%; $ZrO_2$ of 1.1%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1550° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 480° C. for 5 h, reducing the temperature to 30° C. by 1° C./min), and then transferring same to a precision annealing furnace for nucleation, wherein a temperature of nucleation is 545° C., and a time of nucleation is 200 min;

step 3: continuing the crystallization of the nucleated glass brick in a precision annealing furnace, wherein a crystallization temperature is 610° C. and a crystallization time is 200 min, so as to obtain a glass brick after partial crystallization;

step 4 the process of trimming, cutting into pieces, rough grinding and polishing are the same as that in Example 1. After determination, the crystallinity thereof is 45 wt %, and the average particle size of the crystals is 19 nm; when the light source is defined as D65, the absolute value of the b value of the partially crystallized glass original slice is 1.25; the light transmission at a wavelength of 360 nm is 83.36%, the average light transmission at a wavelength of 380-780 nm is 92.50%, the average light transmission at a wavelength of 360-400 nm is 87.16%, and the haze is 0.15%.

step 5: subjecting the partially crystallized original glass sheet to 3D hot bending; and obtaining a 3D glass-ceramic sample 23 by using a hot bending process with the serial number 15 in table 2 (reference can be made to Example 22);

The above-mentioned 3D glass-ceramic sample 23 is tested, and the X-ray diffraction data after the test is analyzed using a ray diffractometer under the same instrument setting conditions as in example 1, wherein the crystallinity of the 3D glass-ceramic sample 23 after hot bending is 92 wt %, the precipitated crystal phase is petalite+lithium disilicate, and the average particle size of the crystal is 20 nm. When a light source is defined as D65, the absolute value of the b value is 0.61; the transmittance of light at a wavelength of 360 nm is 85.82%, the average transmittance of light at a wavelength of 380-780 nm is 91.50%, the average transmittance of light at a wavelength of 360-400 nm is 88.00%, and the haze is 0.15%.

step 6: subjecting the hot-bent 3D glass-ceramic obtained in step 5 to chemical strengthening under the same conditions as in Example 22, and finally obtaining a finished 3D glass-ceramic product 23.

Example 24 step 1: preparing and weighing the raw materials for the preparation of glass (in mole percent, containing the following components: $SiO_2$ of 69.50%; $Al_2O_3$ of 4.25%; $Na_2O$ of 1.60%; $Li_2O$ of 20.5%; $B_2O_3$ of 1.60%, nucleating agent ($P_2O_5$ of 0.8%; $ZrO_2$ of 1.75%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1550° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 480° C. for 5 h, reducing the temperature to 30° C. by 1° C./min), and then transferring same to a precision annealing furnace for nucleation, wherein a temperature of nucleation is 538° C., and a time of nucleation is 200 min;

step 3: continuing the crystallization of the nucleated glass brick in a precision annealing furnace, wherein a crystallization temperature is 620° C. and a crystallization time is 100 min, so as to obtain a glass brick after partial crystallization;

step 4 the process of trimming, cutting into pieces, rough grinding and polishing are the same as that in Example 1. After determination, the crystallinity thereof is 43 wt %, and the average particle size of the crystals is 17 nm; when the light source is defined as D65, the absolute value of the b value of the partially crystallized glass original slice is 1.17; the light transmission at a wavelength of 360 nm is 84.21%, the average light transmission at a wavelength of 380-780 nm is 92.20%, the average light transmission at a wavelength of 360-400 nm is 85.98%, and the haze is 0.19%.

step 5: performing 3D hot bending on the partially crystallized original glass sheet, wherein the hot bending process uses hot bending process with the serial number of 14 in table 2, and the hot bending includes four preheating stations, three hot pressing stations and two cooling stations. A temperature of the first preheating station is 450° C., a temperature of the second preheating station is 600° C., a temperature of the third preheating station is 650° C., and a temperature of the fourth preheating station is 720° C. A temperature of the first hot pressing station is 750° C., an upper pressure is 0.1 MPa, and a lower pressure is 0.1 MPa; a temperature of the second hot pressing station is 760° C., an upper pressure is 0.1 MPa, and a lower pressure is 0.1 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s. A 3D glass-ceramic sample 24 is obtained.

The above-mentioned 3D glass-ceramic sample 24 is tested, and the X-ray diffraction data after the test is analyzed using a ray diffractometer under the same instrument setting conditions as in example 1, wherein the crystallinity of the 3D glass-ceramic sample 24 after hot bending is 82 wt %, the precipitated crystal phase is petalite+lithium disilicate, and the average particle size of the crystal is 22 nm. When a light source is defined as D65, the absolute value of the b value is 0.43; the transmittance of light at a wavelength of 360 nm is 88.17%, the average transmittance of light at a wavelength of 380-780 nm is 92.60%, the average transmittance of light at a wavelength of 360-400 nm is 89.60%, and the haze is 0.11%.

step 6: subjecting the hot-bent 3D glass-ceramic obtained in step 5 to chemical strengthening under the same conditions as in Example 22, and finally obtaining a finished 3D glass-ceramic product 24.

Figure 2:
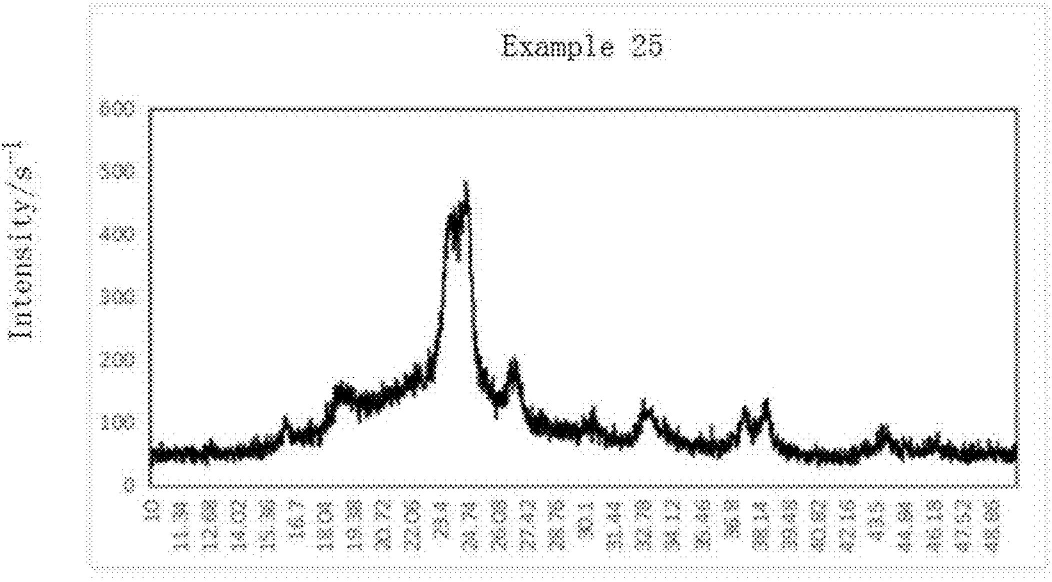
FIG. 2 is an XRD plot of a partially crystallized original glass sheet obtained in step 4 of Example 25.

Example 25 step 1: preparing and weighing the raw materials for the preparation of glass (in mole percent, containing the following components: $SiO_2$ of 68.76%; $Al_2O_3$ of 4.13%; MgO of 0.98%, ZnO of 0.98%, $Na_2O$ of 0.45%; $Li_2O$ of 20.71%; $B_2O_3$ of 1.49%, nucleating agent ($P_2O_5$ of 0.81%; $ZrO_2$ of 1.69%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1550° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 480° C. for 5 h, reducing the temperature to 30° C. by 1° C./min), performing an XRD test on the obtained annealed glass brick to obtain FIG. 1, where it can be seen that the glass brick is in a glassy state and then transferring same to a precision annealing furnace for nucleation, wherein a temperature of nucleation is 540° C., and a time of nucleation is 200 min;

step 3 which is the same as that in Example 24;

step 4 the process of trimming, cutting into pieces, rough grinding and polishing are the same as that in Example 1. After determination, the crystallinity thereof is 47 wt %, and the average particle size of the crystals is 15 nm; when the light source is defined as D65, the absolute value of the b value of the partially crystallized glass original slice is 1.09; the light transmission at a wavelength of 360 nm is 85.01%, the average light transmission at a wavelength of 380-780 nm is 92.40%, the average light transmission at a wavelength of 360-400 nm is 85.81%, and the haze is 0.24%. The resulting partially crystallized original glass sheet is subjected to an XRD test, resulting in FIG. 2, which can be seen to be in a partially crystallized state.

step 5: subjecting the partially crystallized original glass sheet to 3D hot bending; and obtaining a 3D glass-ceramic sample 25 by using a hot bending process with the serial number 14 in table 2 (reference can be made to Example 24).

The above-mentioned 3D glass-ceramic sample 25 is tested, and the X-ray diffraction data after the test is analyzed using a ray diffractometer under the same instrument setting conditions as in example 1, wherein the crystallinity of the 3D glass-ceramic sample 25 after hot bending is 87 wt %, the precipitated crystal phase is lithium disilicate+petalite+β-quartz solid solution, and the average particle size of the crystal is 18 nm. When a light source is defined as D65, the absolute value of the b value is 0.39; the transmittance of light at a wavelength of 360 nm is 88.80%, the average transmittance of light at a wavelength of 380-780 nm is 92.70%, the average transmittance of light at a wavelength of 360-400 nm is 89.80%, and the haze is 0.09%.

step 6: subjecting the hot-bent 3D glass-ceramic obtained in step 5 to chemical strengthening, and immersing the glass in a molten of 100 wt % $NaNO_3$ solution at a temperature of 450° C. for 10 hours to finally obtain a finished 3D glass-ceramic product 25.

Figure 3:
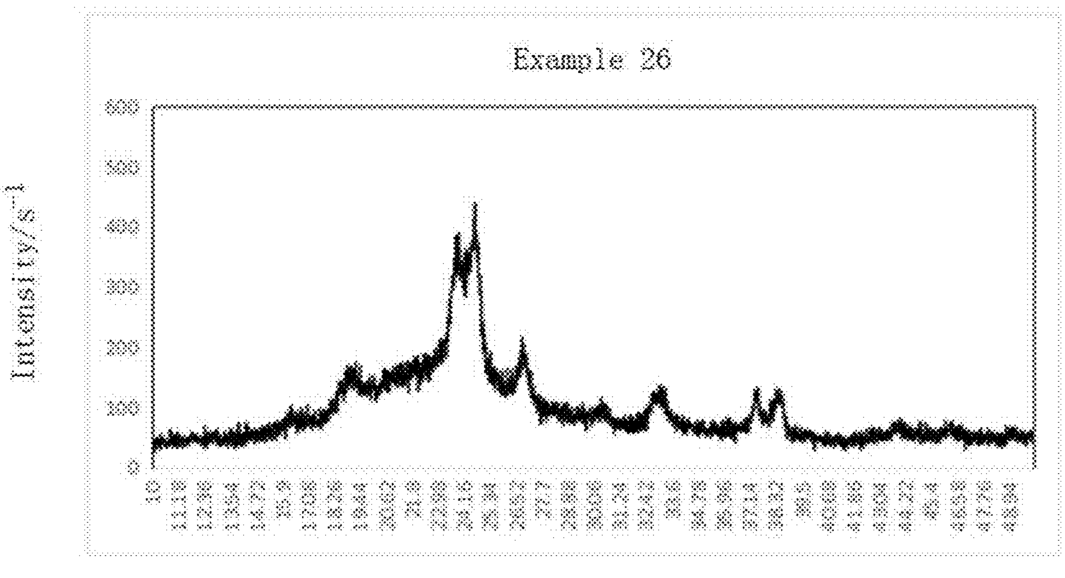
FIG. 3 is an XRD plot of a partially crystallized original glass sheet obtained in step 4 of Example 26.

Example 26 step 1: preparing and weighing the raw materials for the preparation of glass (in mole percent, containing the following components: $SiO_2$ of 68.73%; $Al_2O_3$ of 4.13%; MgO of 0.98%, ZnO of 1.68%, $Na_2O$ of 0.45%; $Li_2O$ of 20.01%; $B_2O_3$ of 1.49%, nucleating agent ($P_2O_5$ of 0.81%; $ZrO_2$ of 1.72%), and 0.5 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1550° C., and a melting time is 5 h, pouring same into a mould made of ASTM SA213 to obtain a glass brick;

step 2 which is the same as that in Example 25;

step 3: continuing the crystallization of the nucleated glass brick in a precision annealing furnace, wherein a crystallization temperature is 615° C. and a crystallization time is 120 min, so as to obtain a glass brick after partial crystallization;

step 4 the process of trimming, cutting into pieces, rough grinding and polishing are the same as that in Example 1. After determination, the crystallinity thereof is 55 wt %, and the average particle size of the crystals is 16 nm; when the light source is defined as D65, the absolute value of the b value of the partially crystallized glass original slice is 1.34; the light transmission at a wavelength of 360 nm is 83.16%, the average light transmission at a wavelength of 380-780 nm is 92.00%, the average light transmission at a wavelength of 360-400 nm is 84.26%, and the haze is 0.29%. The resulting partially crystallized original glass sheet is subjected to an XRD test, resulting in FIG. 3, which can be seen to be in a partially crystallized state.

step 5: subjecting the partially crystallized original glass sheet to 3D hot bending; and obtaining a 3D glass-ceramic sample 26 by using a hot bending process with the serial number 15 in table 2 (reference can be made to Example 22).

The above-mentioned 3D glass-ceramic sample 26 is tested, and the X-ray diffraction data after the test is analyzed using a ray diffractometer under the same instrument setting conditions as in example 1, wherein the crystallinity of the 3D glass-ceramic sample 26 after hot bending is 91 wt %, the precipitated crystal phase is petalite, and the average particle size of the crystal is 23 nm. When a light source is defined as D65, the absolute value of the b value is 0.42; the transmittance of light at a wavelength of 360 nm is 88.13%, the average transmittance of light at a wavelength of 380-780 nm is 92.80%, the average transmittance of light at a wavelength of 360-400 nm is 89.90%, and the haze is 0.11%.

Example 27 step 1: same as Example 18, except for the temperature of the melting and forming process, the temperature of the melting and forming in the present example being 1610° C.;

step 2: after cooling the glass brick obtained in step 1 to 800° C., transferring same to an annealing furnace for annealing (after the annealing process is maintaining at a temperature of 460° C. for 5 h, reducing the temperature to 30° C. by 1° C./min), and then transferring same to a precision annealing furnace for nucleation, wherein a temperature of nucleation is 480° C., and a time of nucleation is 360 min;

step 3: continuing the crystallization of the nucleated glass brick in a precision annealing furnace, wherein a crystallization temperature is 550° C. and a crystallization time is 300 min, so as to obtain a glass brick after partial crystallization;

step 4 the process of trimming, cutting into pieces, rough grinding and polishing are the same as that in Example 1. After determination, the crystallinity thereof is 6 wt %, and the average particle size of the crystals is 5 nm; when the light source is defined as D65, the absolute value of the b value of the partially crystallized glass original slice is 0.2; the light transmission at a wavelength of 360 nm is 90.80%, the average light transmission at a wavelength of 380-780 nm is 93.00%, the average light transmission at a wavelength of 360-400 nm is 91%, and the haze is 0.05%.

step 5: subjecting the partially crystallized original glass sheet to 3D hot bending; and obtaining a 3D glass-ceramic sample 27 by using a hot bending process with the serial number 1 in table 2 (same as Example 1).

The above-mentioned 3D glass-ceramic sample 27 is tested, and the X-ray diffraction data after the test is analyzed using a ray diffractometer under the same instrument setting conditions as in example 1, wherein the crystallinity of the 3D glass-ceramic sample 27 after hot bending is 14 wt %, the precipitated crystal phase is lithium silicate, and the average particle size of the crystal is 10 nm. When a light source is defined as D65, the absolute value of the b value of the 3D glass-ceramic sample 27 is 0.15; the transmittance of light at a wavelength of 360 nm is 90.60%, the average transmittance of light at a wavelength of 380-780 nm is 93.00%, the average transmittance of light at a wavelength of 360-400 nm is 91.40%, and the haze is 0.07%.

Example 28 step 1 which is the same as that in Example 27;

step 2: after cooling the glass brick obtained in step 1 to 800° C., transferring same to an annealing furnace for annealing (after the annealing process is maintaining at a temperature of 460° C. for 5 h, reducing the temperature to 30° C. by 1° C./min), and then transferring same to a precision annealing furnace for nucleation, wherein a temperature of nucleation is 500° C., and a time of nucleation is 300 min;

step 3: continuing the crystallization of the nucleated glass brick in a precision annealing furnace, wherein a crystallization temperature is 570° C. and a crystallization time is 280 min, so as to obtain a glass brick after partial crystallization;

step 4 the process of trimming, cutting into pieces, rough grinding and polishing are the same as that in Example 1. After determination, the crystallinity thereof is 8 wt %, and the average particle size of the crystals is 7 nm; when the light source is defined as D65, the absolute value of the b value of the partially crystallized glass original slice is 0.23; the light transmission at a wavelength of 360 nm is 90.50%, the average light transmission at a wavelength of 380-780 nm is 92.80%, the average light transmission at a wavelength of 360-400 nm is 90.80%, and the haze is 0.06%.

step 5: subjecting the partially crystallized original glass sheet to 3D hot bending; and obtaining a 3D glass-ceramic sample 28 by using a hot bending process with the serial number 1 in table 2.

The above-mentioned 3D glass-ceramic sample 28 is tested, and the X-ray diffraction data after the test is analyzed using a ray diffractometer under the same instrument setting conditions as in example 1, wherein the crystallinity of the 3D glass-ceramic sample 28 after hot bending is 16 wt %, the precipitated crystal phase is lithium silicate, and the average particle size of the crystal is 15 nm. When a light source is defined as D65, the absolute value of the b value of the 3D glass-ceramic sample 28 is 0.25; the transmittance of light at a wavelength of 360 nm is 90.10%, the average transmittance of light at a wavelength of 380-780 nm is 92.80%, the average transmittance of light at a wavelength of 360-400 nm is 91.20%, and the haze is 0.09%.

Example 29 step 1 which is the same as that in Example 27;

step 2 which is the same as that in Example 28;

step 3: continuing the crystallization of the nucleated glass brick in a precision annealing furnace, wherein a crystallization temperature is 560° C. and a crystallization time is 240 min, so as to obtain a glass brick after partial crystallization;

step 4 the process of trimming, cutting into pieces, rough grinding and polishing are the same as that in Example 1. After determination, the crystallinity thereof is 9 wt %, and the average particle size of the crystals is 9 nm; when the light source is defined as D65, the absolute value of the b value of the partially crystallized glass original slice is 0.21; the light transmission at a wavelength of 360 nm is 91%, the average light transmission at a wavelength of 380-780 nm is 92.90%, the average light transmission at a wavelength of 360-400 nm is 90.60%, and the haze is 0.08%.

step 5: subjecting the partially crystallized original glass sheet to 3D hot bending; and obtaining a 3D glass-ceramic sample 28 by using a hot bending process with the serial number 1 in table 2.

The above-mentioned 3D glass-ceramic sample 29 is tested, and the X-ray diffraction data after the test is analyzed using a ray diffractometer under the same instrument setting conditions as in example 1, wherein the crystallinity of the 3D glass-ceramic sample 29 after hot bending is 17 wt %, the precipitated crystal phase is lithium silicate, and the average particle size of the crystal is 13 nm. When a light source is defined as D65, the absolute value of the b value of the 3D glass-ceramic sample 29 is 0.23; the transmittance of light at a wavelength of 360 nm is 90.50%, the average transmittance of light at a wavelength of 380-780 nm is 92.70%, the average transmittance of light at a wavelength of 360-400 nm is 91.50%, and the haze is 0.08%.

Figure 4:
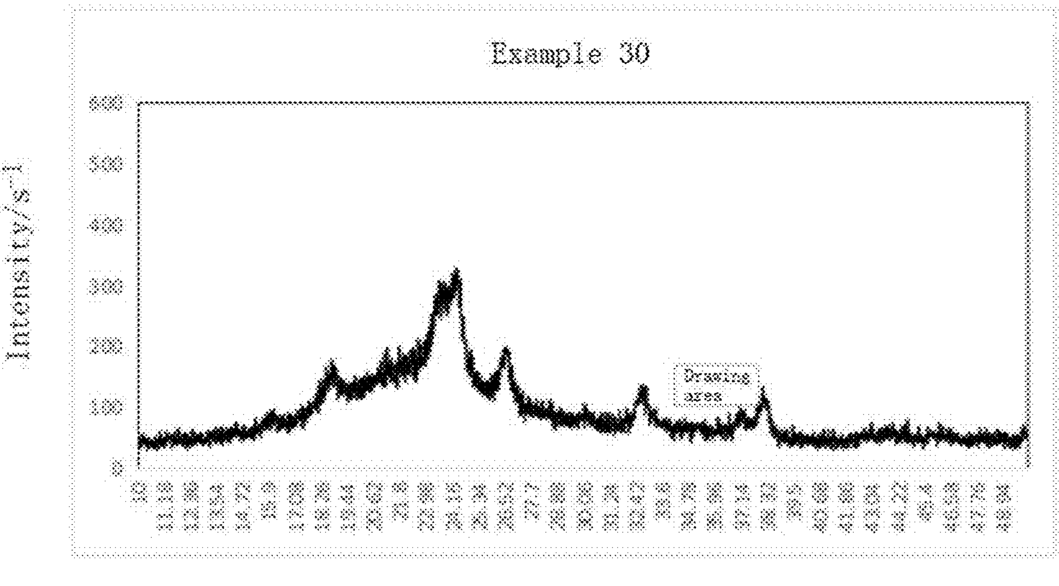
FIG. 4 is an XRD plot of a partially crystallized original glass sheet obtained in step 4 of Example 30.

Example 30 step 1 which is the same as that in Example 17;

step 2: after cooling the glass brick obtained in step 1 to 800° C., transferring same to an annealing furnace for annealing (after the annealing process is maintaining at a temperature of 500° C. for 5 h, reducing the temperature to 30° C. by 1° C./min), and then transferring same to a precision annealing furnace for nucleation, wherein a temperature of nucleation is 600° C., and a time of nucleation is 80 min;

step 3: continuing the crystallization of the nucleated glass brick in a precision annealing furnace, wherein a crystallization temperature is 610° C. and a crystallization time is 180 min, so as to obtain a glass brick after partial crystallization;

step 4 the process of trimming, cutting into pieces, rough grinding and polishing are the same as that in Example 1. After determination, the crystallinity thereof is 37 wt %, and the average particle size of the crystals is 15 nm; when the light source is defined as D65, the absolute value of the b value of the partially crystallized glass original slice is 0.26; the light transmission at a wavelength of 360 nm is 90.20%, the average light transmission at a wavelength of 380-780 nm is 93.00%, the average light transmission at a wavelength of 360-400 nm is 90.30%, and the haze is 0.09%.

step 5: subjecting the partially crystallized original glass sheet to 3D hot bending; and obtaining a 3D glass-ceramic sample 30 by using a hot bending process with the serial number 3 in table 2. The resulting partially crystallized original glass sheet is subjected to an XRD test, resulting in FIG. 4, which can be seen to be in a partially crystallized state.

The above-mentioned 3D glass-ceramic sample 30 is tested, and the X-ray diffraction data after the test is analyzed using a ray diffractometer under the same instrument setting conditions as in example 1, wherein the crystallinity of the 3D glass-ceramic sample 30 after hot bending is 75 wt %, the precipitated crystal phase is petalite+β-quartz solid solution, and the average particle size of the crystal is 18 nm. When a light source is defined as D65, the absolute value of the b value is 0.35; the transmittance of light at a wavelength of 360 nm is 88.20%, the average transmittance of light at a wavelength of 380-780 nm is 92.60%, the average transmittance of light at a wavelength of 360-400 nm is 90.00%, and the haze is 0.11%.

Example 31 step 1 which is the same as that in Example 2;

step 2: after cooling the glass brick obtained in step 1 to 800° C., transferring same to an annealing furnace for annealing (after the annealing process is maintaining at a temperature of 600° C. for 5 h, reducing the temperature to 30° C. by 1° C./min), and then transferring same to a precision annealing furnace for nucleation, wherein a temperature of nucleation is 800° C., and a time of nucleation is 30 min;

step 3: continuing the crystallization of the nucleated glass brick in a precision annealing furnace, wherein a crystallization temperature is 870° C. and a crystallization time is 15 min, so as to obtain a glass brick after partial crystallization;

step 4 the process of trimming, cutting into pieces, rough grinding and polishing are the same as that in Example 1. After determination, the crystallinity thereof is 88 wt %, and the average particle size of the crystals is 26 nm; when the light source is defined as D65, the absolute value of the b value of the partially crystallized glass original slice is 2.4; the light transmission at a wavelength of 360 nm is 74.50%, the average light transmission at a wavelength of 380-780 nm is 88.10%, the average light transmission at a wavelength of 360-400 nm is 80.50%, and the haze is 0.84%.

step 5: subjecting the partially crystallized original glass sheet to 3D hot bending; and obtaining a 3D glass-ceramic sample 31 by using a hot bending process with the serial number 4 in table 2.

The above-mentioned 3D glass-ceramic sample 31 is tested, and the X-ray diffraction data after the test is analyzed using a ray diffractometer under the same instrument setting conditions as in example 1, wherein the crystallinity of the 3D glass-ceramic sample 31 after hot bending is 99 wt %, the precipitated crystal phase is β-spodumene, and the average particle size of the crystal is 48 nm. When a light source is defined as D65, the absolute value of the b value is 2.60; the transmittance of light at a wavelength of 360 nm is 74.10%, the average transmittance of light at a wavelength of 380-780 nm is 89.30%, the average transmittance of light at a wavelength of 360-400 nm is 80.50%, and the haze is 0.78%.

Example 32 step 1 which is the same as that in Example 2;

step 2: after cooling the glass brick obtained in step 1 to 800° C., transferring same to an annealing furnace for annealing (after the annealing process is maintaining at a temperature of 600° C. for 5 h, reducing the temperature to 30° C. by 1° C./min), and then transferring same to a precision annealing furnace for nucleation, wherein a temperature of nucleation is 780° C., and a time of nucleation is 60 min;

step 3: continuing the crystallization of the nucleated glass brick in a precision annealing furnace, wherein a crystallization temperature is 900° C. and a crystallization time is 5 min, so as to obtain a glass brick after partial crystallization;

step 4 the process of trimming, cutting into pieces, rough grinding and polishing are the same as that in Example 1. After determination, the crystallinity thereof is 58 wt %, and the average particle size of the crystals is 50 nm; when the light source is defined as D65, the absolute value of the b value of the partially crystallized glass original slice is 2.5; the light transmission at a wavelength of 360 nm is 73.60%, the average light transmission at a wavelength of 380-780 nm is 88.80%, the average light transmission at a wavelength of 360-400 nm is 80.10%, and the haze is 0.79%.

step 5: subjecting the partially crystallized original glass sheet to 3D hot bending; and obtaining a 3D glass-ceramic sample 32 by using a hot bending process with the serial number 7 in table 2.

The above-mentioned 3D glass-ceramic sample 32 is tested, and the X-ray diffraction data after the test is analyzed using a ray diffractometer under the same instrument setting conditions as in example 1, wherein the crystallinity of the 3D glass-ceramic sample 32 after hot bending is 98 wt %, the precipitated crystal phase is β-spodumene, and the average particle size of the crystal is 81 nm. When a light source is defined as D65, the absolute value of the b value is 2.80; the transmittance of light at a wavelength of 360 nm is 62.00%, the average transmittance of light at a wavelength of 380-780 nm is 88.60%, the average transmittance of light at a wavelength of 360-400 nm is 65.80%, and the haze is 0.72%.

Example 33 step 1: preparing and weighing the raw materials for the preparation of glass (in mole percent, containing the following components: $SiO_2$ of 67.45%; $Al_2O_3$ of 14.20%; CaO of 0.50%; MgO of 1.79%; $Na_2O$ of 1.56%; $Li_2O$ of 9.70%, nucleating agent ($P_2O_5$ of 2.18%; $TiO_2$ of 0.81%; $ZrO_2$ of 1.31%; $Y_2O_3$ of 0.5%), and 0.8 wt % of a fining agent NaCl in the total mass of the nucleating agent and the raw materials for preparation, the total weight of the above-mentioned raw materials is 1713.5 g), and after sufficient mixing, melting and forming in a high-temperature lifting furnace, a temperature of the melting and forming is 1650° C., and a melting time is 5 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 500° C. for 5 h, reducing the temperature to 30° C. by 1° C./min), and then transferring same to a precision annealing furnace for nucleation, wherein a temperature of nucleation is 650° C., and a time of nucleation is 160 min;

step 3: continuing the crystallization of the nucleated glass brick in a precision annealing furnace, wherein a crystallization temperature is 820° C. and a crystallization time is 30 min, so as to obtain a glass brick after partial crystallization;

step 4 the process of trimming, cutting into pieces, rough grinding and polishing are the same as that in Example 1. After determination, the crystallinity thereof is 90 wt %, and the average particle size of the crystals is 47 nm; when the light source is defined as D65, the absolute value of the b value of the partially crystallized glass original slice is 2.8; the light transmission at a wavelength of 360 nm is 72.80%, the average light transmission at a wavelength of 380-780 nm is 88.40%, the average light transmission at a wavelength of 360-400 nm is 80.10%, and the haze is 0.97%.

step 5: subjecting the partially crystallized original glass sheet to 3D hot bending; and obtaining a 3D glass-ceramic sample 33 by using a hot bending process with the serial number 6 in table 2.

The above-mentioned 3D glass-ceramic sample 33 is tested, and the X-ray diffraction data after the test is analyzed using a ray diffractometer under the same instrument setting conditions as in example 1, wherein the crystallinity of the 3D glass-ceramic sample 33 after hot bending is 100 wt %, the precipitated crystal phase is β-spodumene, and the average particle size of the crystal is 98 nm. When a light source is defined as D65, the absolute value of the b value is 3.8; the transmittance of light at a wavelength of 360 nm is 63.10%, the average transmittance of light at a wavelength of 380-780 nm is 88.20%, the average transmittance of light at a wavelength of 360-400 nm is 65.40%, and the haze is 0.98%.

Example 34 step 1: preparing and weighing the raw materials for the preparation of glass (in mole percent, containing the following components: $SiO_2$ of 66.65%; $Al_2O_3$ of 10.87%; MgO of 2.44%; ZnO of 2.82%; $Na_2O$ of 0.21%; $K_2O$ of 0.21%; $Li_2O$ of 9.88%; $B_2O_3$ of 0.94%; nucleating agent ($P_2O_5$ of 1.85%; $ZrO_2$ of 2.00%; $CaF_2$ of 2.13%), and 0.7 wt % of a fining agent NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1640° C., and a melting time is 4 h, pouring same into a mould made of ASTM SA213 to obtain a glass brick;

step 2: after cooling the glass brick obtained in step 1 to 800° C., transferring same to an annealing furnace for annealing (after the annealing process is maintaining at a temperature of 500° C. for 5 h, reducing the temperature to 30° C. by 1° C./min), and then transferring same to a precision annealing furnace for nucleation, wherein a temperature of nucleation is 620° C., and a time of nucleation is 240 min;

step 3: continuing the crystallization of the nucleated glass brick in a precision annealing furnace, wherein a crystallization temperature is 650° C. and a crystallization time is 40 min, so as to obtain a glass brick after partial crystallization;

step 4 the process of trimming, cutting into pieces, rough grinding and polishing are the same as that in Example 1. After determination, the crystallinity thereof is 68 wt %, and the average particle size of the crystals is 42 nm; when the light source is defined as D65, the absolute value of the b value of the partially crystallized glass original slice is 1.45; the light transmission at a wavelength of 360 nm is 82.90%, the average light transmission at a wavelength of 380-780 nm is 91.70%, the average light transmission at a wavelength of 360-400 nm is 85.60%, and the haze is 0.38%.

step 5: subjecting the partially crystallized original glass sheet to 3D hot bending; and obtaining a 3D glass-ceramic sample 34 by using a hot bending process with the serial number 7 in table 2.

The above-mentioned 3D glass-ceramic sample 34 is tested, and the X-ray diffraction data after the test is analyzed using a ray diffractometer under the same instrument setting conditions as in example 1, wherein the crystallinity of the 3D glass-ceramic sample 34 after hot bending is 79 wt %, the precipitated crystal phase is β-quartz solid solution, and the average particle size of the crystal is 65 nm. When a light source is defined as D65, the absolute value of the b value is 0.76; the transmittance of light at a wavelength of 360 nm is 84.22%, the average transmittance of light at a wavelength of 380-780 nm is 91.00%, the average transmittance of light at a wavelength of 360-400 nm is 87.50%, and the haze is 0.16%.

Example 35 step 1: preparing and weighing the raw materials for the preparation of glass (in mole percent, containing the following components: $SiO_2$ of 64.55%; $Al_2O_3$ of 10.45%; MgO of 2.37%; ZnO of 2.73%; $Na_2O$ of 0.21%; $K_2O$ of 0.20%; $Li_2O$ of 9.58%; $B_2O_3$ of 0.91%; nucleating agent ($P_2O_5$ of 1.94%; $TiO_2$ of 2.91%; $ZrO_2$ of 2.02%; $CaF_2$ of 2.13%), and 0.7 wt % of a fining agent NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1640° C., and a melting time is 4 h, pouring same into a mould made of ASTM SA213 to obtain a glass brick;

step 2 and step 3 which are the same as those in Example 35;

step 4 the process of trimming, cutting into pieces, rough grinding and polishing are the same as that in Example 1. After determination, the crystallinity thereof is 82 wt %, and the average particle size of the crystals is 35 nm; when the light source is defined as D65, the absolute value of the b value of the partially crystallized glass original slice is 1.32; the light transmission at a wavelength of 360 nm is 83.40%, the average light transmission at a wavelength of 380-780 nm is 91.40%, the average light transmission at a wavelength of 360-400 nm is 86.30%, and the haze is 0.31%.

step 5: subjecting the partially crystallized original glass sheet to 3D hot bending; and obtaining a 3D glass-ceramic sample 35 by using a hot bending process with the serial number 6 in table 2.

The above-mentioned 3D glass-ceramic sample 35 is tested, and the X-ray diffraction data after the test is analyzed using a ray diffractometer under the same instrument setting conditions as in example 1, wherein the crystallinity of the 3D glass-ceramic sample 35 after hot bending is 86 wt %, the precipitated crystal phase is β-quartz solid solution, and the average particle size of the crystal is 42 nm. After determination, when the light source is defined as D65, the absolute value of b value is 0.68; the transmittance of light at a wavelength of 360 nm is 85.42%, the average transmittance of light at a wavelength of 380-780 nm is 91.10%, the average transmittance of light at a wavelength of 360-400 nm is 87.20%, and the haze is 0.19%.

Example 36 step 1: preparing and weighing the raw materials for the preparation of glass (in mole percent, containing the following components: $SiO_2$ of 70.13%; $Al_2O_3$ of 11.50%; MgO of 2.57%; ZnO of 2.97%; $Na_2O$ of 0.22%; $K_2O$ of 0.22%; $Li_2O$ of 10.40%; $B_2O_3$ of 0.99%; nucleating agent ($P_2O_5$ of 0.84%; $CaF_2$ of 0.16%), and 0.7 wt % of a fining agent NaCl in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1640° C., and a melting time is 3 h, pouring same into a mould made of ASTM SA213 to obtain a glass brick;

step 2 and step 3 which are the same as those in Example 34;

step 4 the process of trimming, cutting into pieces, rough grinding and polishing are the same as that in Example 1. After determination, the crystallinity thereof is 63 wt %, and the average particle size of the crystals is 24 nm; when the light source is defined as D65, the absolute value of the b value of the partially crystallized glass original slice is 1.32; the light transmission at a wavelength of 360 nm is 84.10%, the average light transmission at a wavelength of 380-780 nm is 91.60%, the average light transmission at a wavelength of 360-400 nm is 87.10%, and the haze is 0.33%.

step 5: subjecting the partially crystallized original glass sheet to 3D hot bending; and obtaining a 3D glass-ceramic sample 36 by using a hot bending process with the serial number 5 in table 2.

The above-mentioned 3D glass-ceramic sample 36 is tested, and the X-ray diffraction data after the test is analyzed using a ray diffractometer under the same instrument setting conditions as in example 1, wherein the crystallinity of the 3D glass-ceramic sample 36 after hot bending is 70 wt %, the precipitated crystal phase is β-quartz solid solution, and the average particle size of the crystal is 37 nm. When a light source is defined as D65, the absolute value of the b value is 0.53; the transmittance of light at a wavelength of 360 nm is 86.00%, the average transmittance of light at a wavelength of 380-780 nm is 92.20%, the average transmittance of light at a wavelength of 360-400 nm is 88.60%, and the haze is 0.10%.

Example 37

Preparation methods of a crystallized glass raw material and a method for continuously preparing a 3D glass-ceramic using the crystallized glass raw:

step 1: same as Example 17, only except for the temperature of the melting and forming process and the melting time. the temperature of the melting and forming in this example being 1650° C., and the melting time being 2 h;

step 2: after cooling the glass brick obtained in step 1 to 800° C., transferring same to an annealing furnace for annealing (after the annealing process is maintaining at a temperature of 500° C. for 5 h, reducing the temperature to 30° C. by 1° C./min), and then transferring same to a precision annealing furnace for nucleation, wherein a temperature of nucleation is 600° C., and a time of nucleation is 80 min;

step 3: continuing the crystallization of the nucleated glass brick in a precision annealing furnace, wherein a crystallization temperature is 600° C. and a crystallization time is 240 min, so as to obtain a glass brick after partial crystallization;

step 4 the process of trimming, cutting into pieces, rough grinding and polishing are the same as that in Example 1. After determination, the crystallinity thereof is 75 wt %, and the average particle size of the crystals is 29 nm; when the light source is defined as D65, the absolute value of the b value of the partially crystallized glass original slice is 1.5; the light transmission at a wavelength of 360 nm is 83.50%, the average light transmission at a wavelength of 380-780 nm is 91.20%, the average light transmission at a wavelength of 360-400 nm is 85.80%, and the haze is 0.39%.

step 5: subjecting the partially crystallized original glass sheet to 3D hot bending; and obtaining a 3D glass-ceramic sample 37 by using a hot bending process with the serial number 6 in table 2.

The above-mentioned 3D glass-ceramic sample 37 is tested, and the X-ray diffraction data after the test is analyzed using a ray diffractometer under the same instrument setting conditions as in example 1, wherein the crystallinity of the 3D glass-ceramic sample 37 after hot bending is 88 wt %, the precipitated crystal phase is petalite+β-quartz solid solution, and the average particle size of the crystal is 57 nm. When a light source is defined as D65, the absolute value of the b value is 0.38; the transmittance of light at a wavelength of 360 nm is 88.40%, the average transmittance of light at a wavelength of 380-780 nm is 92.80%, the average transmittance of light at a wavelength of 360-400 nm is 90.10%, and the haze is 0.12%.

Example 38 step 1, step 2, step 3 and step 4 which are the same as in Example 22;

step 5: performing 3D hot bending on the partially crystallized original glass sheet, wherein the hot bending process uses hot bending process with the serial number of 20 in table 2, and the hot bending includes three preheating stations, four hot pressing stations and two cooling stations. A temperature of the first preheating station is 450° C., a temperature of the second preheating station is 600° C., and a temperature of the third preheating station is 650° C. A temperature of the first hot pressing station is 760° C., an upper pressure is 0.1 MPa, and a lower pressure is 0.1 MPa; a temperature of the second hot pressing station is 750° C., an upper pressure is 0.1 MPa, and a lower pressure is 0.1 MPa; a temperature of the third hot pressing station is 720° C., an upper pressure is 0.1 MPa and a lower pressure is 0.1 MPa; a temperature of the fourth hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 140 s, and a 3D glass-ceramic sample 22F is obtained.

The above-mentioned 3D glass-ceramic sample 22F is tested, and the X-ray diffraction data after the test is analyzed using a ray diffractometer under the same instrument setting conditions as in example 1, wherein the crystallinity of the 3D glass-ceramic sample 22F after hot bending is 84 wt %, the precipitated crystal phase is petalite+lithium disilicate, and the average particle size of the crystal is 18 nm. When a light source is defined as D65, the absolute value of the b value is 0.43; the transmittance of light at a wavelength of 360 nm is 88.15%, the average transmittance of light at a wavelength of 380-780 nm is 92.77%, the average transmittance of light at a wavelength of 360-400 nm is 89.45%, and the haze is 0.11%.

Example 39 step 1, step 2, step 3 and step 4 which are the same as in Example 22;

step 5: performing 3D hot bending on the partially crystallized original glass sheet, wherein the hot bending process uses hot bending process with the serial number of 21 in table 2, and the hot bending includes five preheating stations, three hot pressing stations and two cooling stations. A temperature of the first preheating station is 430° C., a temperature of the second preheating station is 500° C., a temperature of the third preheating station is 600° C., a temperature of the fourth preheating station is 680° C., and a temperature of the fifth preheating station is 720° C. A temperature of the first hot pressing station is 745° C., an upper pressure is 0.5 MPa, and a lower pressure is 0.5 MPa; a temperature of the second hot pressing station is 760° C., an upper pressure is 0 MPa, and a lower pressure is 0 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 140 s, and a 3D glass-ceramic sample 22G is obtained.

The above-mentioned 3D glass-ceramic sample 22G is tested, and the X-ray diffraction data after the test is analyzed using a ray diffractometer under the same instrument setting conditions as in example 1, wherein the crystallinity of the 3D glass-ceramic sample 22G after hot bending is 90 wt %, the precipitated crystal phase is petalite+lithium disilicate, and the average particle size of the crystal is 22 nm. When a light source is defined as D65, the absolute value of the b value is 0.55; the transmittance of light at a wavelength of 360 nm is 86.12%, the average transmittance of light at a wavelength of 380-780 nm is 92.40%, the average transmittance of light at a wavelength of 360-400 nm is 88.40%, and the haze is 0.10%.

COMPARATIVE EXAMPLES

Comparative Example 1 step 1: preparing and weighing the raw materials for the preparation of glass (in mole percent, containing the following components: $SiO_2$ of 62.40%; $Al_2O_3$ of 13.24%; MgO of 4.46%; $Na_2O$ of 1.46%; $Li_2O$ of 9.04%, nucleating agent ($P_2O_5$ of 0.94%; $ZrO_2$ of 6.58%; $TiO_2$ of 1.88% totaling 9.40% of the nucleating agent), and 0.8 wt % of NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2, which is the same as Example 4, wherein it can be seen that the nucleated original glass sheet has precipitated crystals and is in a ceramic state, which does not meet the conditions for the subsequent hot-bending process.

Comparative Example 2 step 1: preparing and weighing the raw materials for the preparation of glass (in mole percent, containing the following components: $SiO_2$ of 60.70%; $Al_2O_3$ of 12.87%; MgO of 4.34%; $Na_2O$ of 1.42%; $Li_2O$ of 8.79%, nucleating agent ($P_2O_5$ of 0.91%; $ZrO_2$ of 9.14%; $TiO_2$ of 1.83% totaling 11.88% of the nucleating agent), and 0.8 wt % of NaCl in the total mass of the nucleating agent and the raw materials for preparation, the total weight of the above-mentioned raw materials is 1713.6 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: during the process of cooling the glass brick obtained in step 1 to 800° C., crystals being precipitated in a central part, and a stress difference appearing in an interior of the glass brick, which causes the glass brick to be broken and cannot be machined.

Comparative Example 3 step 1: preparing and weighing the raw materials for the preparation of glass (in mole percent, containing the following components: $SiO_2$ of 67.45%; $Al_2O_3$ of 14.20%; CaO of 0.50%; MgO of 1.79%; $Na_2O$ of 1.56%; $Li_2O$ of 9.70%, nucleating agent ($P_2O_5$ of 2.18%; $ZrO_2$ of 1.31%; $TiO_2$ of 0.81%; and $Y_2O_3$ of 0.5%), and 0.8 wt % of a fining agent NaCl in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2 which is the same as that in Example 4;

step 3: continuing the crystallization of the nucleated glass brick in a precision annealing furnace, wherein a crystallization temperature is 930° C. and a crystallization time is 30 min; after the crystallization, the glass brick showing uncontrollable devitrification due to the over-high crystallization temperature, wherein the stress difference in the glass brick causes the glass brick to fracture and the glass brick can not be machined.

Comparative Example 4 step 1: preparing and weighing the raw materials for the preparation of glass (in mole percent, containing the following components: $SiO_2$ of 70.33%; $Al_2O_3$ of 14.82%; $Na_2O$ of 1.63%; $Li_2O$ of 10.11%; MgO of 1.34%; ZnO of 1.04%, nucleating agent ($P_2O_5$ of 0.52%; $ZrO_2$ of 0.21%), and NaCl of 0.4 wt % and $SnO_2$ of 0.4 wt % as a fining agent in the total mass of the nucleating agent and the raw materials for preparation, the total weight of the above-mentioned raw materials is 1708.5 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

steps 2 and 3 which are the same as the conditions of example 33, performing an XRD test on the nucleated glass brick, wherein it can be seen that crystal nucleus cannot occur due to too little nucleating agent, uncontrollable devitrification occurs during the crystallization, and a stress difference occurs inside the glass, resulting in breakage of the hot-bent glass.

Comparative Example 5 step 1: preparing and weighing the raw materials for the preparation of glass (in mole percent, containing the following components: $SiO_2$ of 70.45%; $Al_2O_3$ of 13.16%; MgO of 2.78%; $Na_2O$ of 0.56%; $Li_2O$ of 7.98%; $B_2O_3$ of 1.00%; nucleating agent ($P_2O_5$ of 1.67%; $ZrO_2$ of 1.30%; $TiO_2$ of 0.60%; and $Y_2O_3$ of 0.5%), and NaCl of 0.4 wt % and $CeO_2$ of 0.3 wt % as a fining agent in the total mass of the nucleating agent and the raw materials for preparation, the total weight of the above-mentioned raw materials is 1711.9 g), and after sufficient mixing, melting and forming in a high-temperature lifting furnace, a temperature of the melting and forming is 1630° C., and a melting time is 5 h, pouring same into a mould made of ASTM SA213 to obtain a glass brick;

step 2: cooling the glass brick obtained in step 1 to 900° C., and then transferring same to a precision annealing furnace for a nucleation; a temperature of nucleation is 850° C., and a time of nucleation is 120 min; after the nucleation, wherein the glass brick shows uncontrollable devitrification due to the high temperature of nucleation, and the stress difference in the glass brick causes the glass brick to be broken, so the subsequent processes cannot be carried out.

Comparative Example 6 step 1, step 2, step 3 and step 4 which are the same as in Example 22;

step 5: performing 3D hot bending on the partially crystallized original glass sheet, wherein the hot bending process uses hot bending process with the serial number of 16 in table 2, and the hot bending includes four preheating stations, three hot pressing stations and two cooling stations. A temperature of the first preheating station is 480° C., a temperature of the second preheating station is 600° C., a temperature of the third preheating station is 650° C., and a temperature of the fourth preheating station is 720° C. A temperature of the first hot pressing station is 940° C., an upper pressure is 0.1 MPa, and a lower pressure is 0.1 MPa; a temperature of the second hot pressing station is 920° C., an upper pressure is 0.1 MPa, and a lower pressure is 0.1 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s. A 3D glass-ceramic sample 22B is obtained.

The above-mentioned 3D glass-ceramic sample 22B is tested, and the X-ray diffraction data after the test is analyzed using a ray diffractometer under the same instrument setting conditions as in example 1, wherein the crystallinity of the 3D glass-ceramic sample 22B after hot bending is 100 wt %, the precipitated crystal phase is β-spodumene+lithium disilicate, and the average particle size of the crystal is 111 nm. When a light source is defined as D65, the absolute value of the b value is 7.45; the transmittance of light at a wavelength of 360 nm is 64.10%, the average transmittance of light at a wavelength of 380-780 nm is 86.50%, the average transmittance of light at a wavelength of 360-400 nm is 69.20%, and the haze is 0.99%. As the hot-pressing temperature is too high, the final prepared glass-ceramics have a high average crystal size, resulting in an increase in b value, a decrease in light transmittance, and a too high b value, and the glass-ceramics are bluish, affecting imaging.

Comparative Example 7 step 1, step 2, step 3 and step 4 which are the same as in Example 22;

step 5: performing 3D hot bending on the partially crystallized original glass sheet, wherein the hot bending process uses hot bending process with the serial number of 17 in table 2, and the hot bending includes four preheating stations, three hot pressing stations and two cooling stations. A temperature of the first preheating station is 450° C., a temperature of the second preheating station is 600° C., a temperature of the third preheating station is 650° C., and a temperature of the fourth preheating station is 720° C. A temperature of the first hot pressing station is 930° C., an upper pressure is 0.1 MPa, and a lower pressure is 0.1 MPa; a temperature of the second hot pressing station is 920° C., an upper pressure is 0.1 MPa, and a lower pressure is 0.1 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s. A 3D glass-ceramic sample 22C is obtained.

The above-mentioned 3D glass-ceramic sample 22C is tested, and the X-ray diffraction data after the test is analyzed using a ray diffractometer under the same instrument setting conditions as in example 1, wherein the crystallinity of the 3D glass-ceramic sample 22C after hot bending is 100 wt %, the precipitated crystal phase is β-spodumene+lithium disilicate, and the average particle size of the crystal is 124 nm. After determination, when a light source is defined as D65, the absolute value of the b value is 7.86; the transmittance of light at a wavelength of 360 nm is 62.40%, the average transmittance of light at a wavelength of 380-780 nm is 87.30%, the average transmittance of light at a wavelength of 360-400 nm is 68.20%, and the haze is 1.10%. As the hot-pressing temperature is too high, the final prepared glass-ceramics have a high average crystal size, resulting in an increase in b value, a decrease in light transmittance, and a too high b value, and the glass-ceramics are bluish, affecting imaging.

Comparative Example 8 step 1, step 2, step 3 and step 4 which are the same as in Example 22;

step 5: performing 3D hot bending on the partially crystallized original glass sheet, wherein the hot bending process uses hot bending process with the serial number of 18 in table 2, and the hot bending includes four preheating stations, three hot pressing stations and two cooling stations. A temperature of the first preheating station is 450° C., a temperature of the second preheating station is 500° C., a temperature of the third preheating station is 650° C., and a temperature of the fourth preheating station is 650° C. A temperature of the first hot pressing station is 580° C., an upper pressure is 0.1 MPa, and a lower pressure is 0.1 MPa; a temperature of the second hot pressing station is 600° C., an upper pressure is 0.1 MPa, and a lower pressure is 0.1 MPa; a temperature of the third hot pressing station is 600° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s. A 3D glass-ceramic sample 22D is obtained. Due to the low hot-pressing temperature, the 3D glass-ceramic sample 22D cannot be hot-bent into the target shape.

Comparative Example 9 step 1, step 2, step 3 and step 4 which are the same as in Example 22;

step 5: performing 3D hot bending on the partially crystallized original glass sheet, wherein the hot bending process uses hot bending process with the serial number of 19 in table 2, and the hot bending includes three preheating stations, three hot pressing stations and two cooling stations. A temperature of the first preheating station is 500° C., a temperature of the second preheating station is 550° C., and a temperature of the third preheating station is 600° C. A temperature of the first hot pressing station is 600° C., an upper pressure is 0.1 MPa, and a lower pressure is 0.1 MPa; a temperature of the second hot pressing station is 580° C., an upper pressure is 0.1 MPa, and a lower pressure is 0.1 MPa; a temperature of the third hot pressing station is 550° C., an upper pressure is 0 MPa and a lower pressure is 0 MPa. A temperature of the first cooling station is 450° C. and a temperature of the second cooling station is 300° C. A working time of each of the preheating station, the hot pressing station and the cooling station is the same and is 90 s, and a 3D glass-ceramic sample 22E is obtained. Due to the low hot-pressing temperature, the 3D glass-ceramic sample 22E cannot be hot-bent into the target shape.

Application Examples

Mechanical parameters are measured for the 3D glass-ceramics obtained after chemical strengthening according to Examples 1, 2, 4, 7, 12, 16, 22, 23, 24 and 25, and the glass thickness is measured to be 0.65 mm, and the results are shown in Table 3.

A SLP-2000 stress gauge is used to perform a test that is conventional, which is set to a photoelastic coefficient of 25.5 and a refractive index of 1.54, and the test results include a surface compressive stress, a compressive stress depth and an average tensile stress, wherein a linear density of the tensile stress is a calculated value, and the tensile stress obtained by the SLP-2000 stress meter is divided by the glass thickness.

Surface compressive stress (MPa): after the glass is chemically strengthened, the alkali metal ions with a smaller radius on the surface are replaced by alkali metal ions with a larger radius, and due to the plug effect of alkali metal ions with a larger radius, the glass surface thus generates compressive stress, which is called surface compressive stress;

Compressive stress depth (μm): the distance from the surface of the chemically strengthened glass to the position where the compressive stress is zero;

Average tensile stress CT-AV (MPa): a ratio of a sum of the tensile stresses obtained according to the test by SLP-2000 stress gauge to a thickness of the zone of the tensile stress;

Linear density of the tensile stress CT-LD: a ratio of a tensile stress integral to the glass thickness of the chemically strengthened glass at its thickness section obtained according to the test by the SLP-2000 stress gauge;

Whole machine drop test: a method for testing the intensity of strengthened glass, wherein the strengthened glass sheet is attached with electronic equipment samples such as mobile phones, falls down from a free fall at a height, and the height at which the glass is broken is recorded, and this height value can reflect the strength of the glass, and this test method is referred to as whole machine drop test. The test method of this patent is as follows: a mobile phone loaded with 180 g of strengthened glass sheet being freely dropped on 120 mesh sandpaper, and the sandpaper being closely adhered to a marble floor;

Vickers hardness (HV) (pressure of 300 gf for 10 s): a diamond regular pyramid indenter with an included angle of 136 degrees between opposite faces being used to press a surface of the test sample under the action of a load of 300 gf, the load being removed after reservation for 10 s, a diagonal length d of the indentation being measured, and then a surface area of the indentation being calculated, and finally an average pressure on the surface area of the indentation being calculated, namely, the Vickers hardness value of the glass, which is represented by the symbol HV.

TABLE 3

Determination of mechanical parameters

| Items | | Example 1 | Example 2 | Example 4 | Example 7 | Example 12 | Example 16 | Example 22 | Example 23 | Example 24 | Example 25 |
|---|---|---|---|---|---|---|---|---|---|---|---|
| Finished products of 3D glass-ceramics after chemical strengthening Stress test data | Surface compressive stress (MPa) | 423 | 430 | 387 | 498 | 514 | 356 | 108 | 114 | 120 | 145 |
| | Compressive stress depth (μm) | 114 | 121 | 109 | 113 | 120 | 109 | 105 | 107 | 111 | 114 |
| | Average tensile stress CT-AV (MPa) | 84 | 87 | 72 | 92 | 93 | 63 | 42 | 44 | 47 | 48 |
| | Linear density of tensile stress CT-LD | 38214 | 43157 | 36541 | 42130 | 41035 | 34035 | 30145 | 31247 | 32641 | 32189 |
| Whole machine drop height (m) of finished 3D glass-ceramics loaded with 180 g (wherein the floor medium is marble) | | 1.51 | 1.63 | 1.58 | 1.65 | 1.60 | 1.70 | 1.82 | 1.80 | 1.75 | 1.81 |
| Vickers hardness (HV) after nucleation (the pressure being kept at 300N for 10 s) ($kgf/mm^2$) | | 658 | 661 | 649 | 631 | 625 | 612 | 536 | 530 | 527 | 533 |
| Vickers hardness (HV) after partial crystallization (the pressure being kept at 300N for 10 s) ($kgf/mm^2$) | | 694 | 682 | 691 | 687 | 679 | 677 | 657 | 652 | 664 | 682 |

TABLE 3-continued

| Determination of mechanical parameters | | | | | | | | | | |
|---|---|---|---|---|---|---|---|---|---|---|
| Items | Example 1 | Example 2 | Example 4 | Example 7 | Example 12 | Example 16 | Example 22 | Example 23 | Example 24 | Example 25 |
| Vickers hardness (HV) of 3D glass-ceramic samples after 3D hot bending (the pressure being kept at 300N for 10 s) ($kgf/mm^2$) | 718 | 714 | 719 | 702 | 698 | 712 | 713 | 708 | 705 | 725 |
| Vickers glass- (HV) of 3D hardness finished ceramic products after chemical (the strengthening pressure being kept at 300N for 10 s) ($kgf/mm^2$) | 721 | 725 | 731 | 730 | 712 | 735 | 741 | 734 | 729 | 729 |

As can be seen from the table, the finished products of 3D glass-ceramic after chemical strengthening in the examples have a surface compressive stress of 108-514 MPa, a compressive stress depth of 109-121 m, an average tensile stress CT-AV of 42-93 MPa, a linear density of tensile stress CT-LD of 30145-43157, a whole machine drop test height of 1.51-1.82 m, and a Vickers hardness (maintained at a pressure of 300 gf for 10 s) of 712-741 $kgf/mm^2$.

What has been described above is merely a preferred examples of the disclosure and is not intended to limit the disclosure in any way. Thus, it is intended that the scope of protection of the present disclosure cover the modifications, equivalents, and improvements falling within the spirit and principle of the disclosure.

The invention claimed is:

1. A 3D glass-ceramic, characterized in that the 3D glass-ceramic is produced by 3D hot bending using crystallized glass raw material, a hot bending time is within 30 min, a crystalline phase of the 3D glass-ceramic includes petalite and lithium disilicate, the crystallized glass raw material includes the following ratio of oxides in mol %:

| composition | mol % |
|---|---|
| $SiO_2$ | 55%~74% |
| $Al_2O_3$ | 3%~19% |
| $B_2O_3$ | 0%~4% |
| MgO | 0%~6% |
| $Na_2O$ | 0%~3% |
| $Li_2O$ | 6%~25% |
| $K_2O$ | 0%~1% |
| CaO | 0-2% |
| ZnO | 0-5% |
| rare earth oxide | 0-3% |

wherein, the rare earth oxide being selected from one or two or more of $La_2O_3$, $Eu_2O_3$, $Pr_6O_{11}$, $Nd_2O_3$, $Er_2O_3$ and $Dy_2O_3$, the crystallized glass raw material has a thickness of 0.02-5 mm, the crystallized glass raw material has a crystallinity of 5-90 wt %, and the crystallized glass raw material has an average transmittance of 85-93% in a wavelength range of light of 380-780 nm.

2. The 3D glass-ceramic according to claim 1, wherein the thickness of the crystallized glass raw material is 0.35-1.2 mm, and the crystallized glass raw material has a crystallinity of 30-75 wt % or 75-90 wt %.

3. The 3D glass-ceramic according to claim 1, wherein the crystallized glass raw material has an average transmittance of 80-91% in a wavelength range of light of 360-400 nm.

4. The 3D glass-ceramic according to claim 1, wherein an absolute value of b value (yellow-blue value) when the thickness of the crystallized glass raw material is 0.7 mm is 0.2-3; the crystallized glass raw material has a haze of 0.05-1.0%.

5. The 3D glass-ceramic according to claim 1, wherein the crystallized glass raw material includes a nucleating agent, the nucleating agent comprises one or two or more of $P_2O_5$, $TiO_2$, $ZrO_2$, $Cr_2O_3$, $CaF_2$, LiF, NaF, KF, $Y_2O_3$, Au, Ag and Cu on an oxide basis or a fluoride basis or an element basis.

6. The 3D glass-ceramic according to claim 1, wherein the crystallized glass raw material includes a fining agent, the fining agent comprises one or two or more of NaCl, $Na_2SO_4$, $SnO_2$, $As_2O_3$, $Sb_2O_3$, $NaNO_3$, $KNO_3$, $CeO_2$ and $(NH_4)_2SO_4$.

7. The 3D glass-ceramic according to claim 1, wherein the crystallized glass raw material is crystals with an average particle size of 5-50 nm after being subjected to nucleation and crystallization.

8. The 3D glass-ceramic according to claim 1, wherein the crystallized glass raw material has a Vickers hardness of greater than 500 $kgf/mm^2$, at a force load of 300 gf for 10 s.

9. The 3D glass-ceramic according to claim 3, wherein an absolute value of b value (yellow-blue value) when the thickness of the crystallized glass raw material is 0.7 mm is 0.2-3; the crystallized glass raw material has a haze of 0.05-1.0%.

10. The 3D glass-ceramic according to claim 2, wherein the crystallized glass raw material includes the following ratio of oxides by molar ratio:

| composition | mol % |
|---|---|
| $SiO_2$ | 65.1%~74% |
| $Al_2O_3$ | 3%~8.51% |
| $B_2O_3$ | 0%~4% |
| MgO | 0%~6% |
| $Na_2O$ | 0%~3% |
| $Li_2O$ | 20.01%~25% |
| $K_2O$ | 0%~1% |
| CaO | 0-2% |
| ZnO | 0-5% |
| rare earth oxide | 0-3% |

wherein, the rare earth oxide being one or two or more members selected from the group consisting of $La_2O_3$, $Eu_2O_3$, $Pr_6O_{11}$, $Nd_2O_3$, $Er_2O_3$ and $Dy_2O_3$.

11. The 3D glass-ceramic according to claim 3, wherein the crystallized glass raw material includes the following ratio of oxides by molar ratio:

| composition | mol % |
|---|---|
| $SiO_2$ | 65.1%~74% |
| $Al_2O_3$ | 3%~8.51% |
| $B_2O_3$ | 0%~4% |
| MgO | 0%~6% |
| $Na_2O$ | 0%~3% |
| $Li_2O$ | 20.01%~25% |
| $K_2O$ | 0%~1% |
| CaO | 0-2% |
| ZnO | 0-5% |
| rare earth oxide | 0-3% |

wherein, the rare earth oxide being one or two or more members selected from the group consisting of $La_2O_3$, $Eu_2O_3$, $Pr_6O_{11}$, $Nd_2O_3$, $Er_2O_3$ and $Dy_2O_3$.

12. The 3D glass-ceramic according to claim 4, wherein the crystallized glass raw material includes the following ratio of oxides by molar ratio:

| composition | mol % |
|---|---|
| $SiO_2$ | 65.1%~74% |
| $Al_2O_3$ | 3%~8.51% |
| $B_2O_3$ | 0%~4% |
| MgO | 0%~6% |
| $Na_2O$ | 0%~3% |
| $Li_2O$ | 20.01%~25% |
| $K_2O$ | 0%~1% |
| CaO | 0-2% |
| ZnO | 0-5% |
| rare earth oxide | 0-3% |

wherein, the rare earth oxide being one or two or more members selected from the group consisting of $La_2O_3$, $Eu_2O_3$, $Pr_6O_{11}$, $Nd_2O_3$, $Er_2O_3$ and $Dy_2O_3$.

13. The 3D glass-ceramic according to claim 1, characterized in that the crystallized glass raw material is transparent or opaque.

14. The 3D glass-ceramic according to claim 1, characterized in that the crystallized glass raw material is curved or planar.

15. A mobile phone display screen, a tablet computer display screen, a palm game, an electronic terminal, a portable digital device, a vehicle-mounted central control screen, an electronic whiteboard glass, a smart home touch screen, a vehicle windshield glass, an aerocraft windshield glass or an aircraft windshield glass prepared from the 3D glass-ceramic according to claim 1.

* * * * *